US012042455B2

(12) United States Patent
Alvarez et al.

(10) Patent No.: US 12,042,455 B2
(45) Date of Patent: Jul. 23, 2024

(54) PATIENT TRANSPORT APPARATUS

(71) Applicant: Sage Products, LLC, Cary, IL (US)

(72) Inventors: Ryan A. Alvarez, Chicago, IL (US); David P. Beck, Crystal Lake, IL (US); Jay Roberts, Barrington, IL (US); Michael J. Rigoni, Cary, IL (US); Garret W. Sweetwood, Lake in the Hills, IL (US); Hester C. Fletcher, Louisa, VA (US); Thomas Keaty, Jr., Crystal Lake, IL (US); Gregory T. Davis, Woodstock, IL (US); Paul H. Hanifl, Barrington Hills, IL (US)

(73) Assignee: Sage Products, LLC, Cary, IL (US)

( * ) Notice: Subject to any disclaimer, the term of this patent is extended or adjusted under 35 U.S.C. 154(b) by 45 days.

(21) Appl. No.: 17/687,942

(22) Filed: Mar. 7, 2022

(65) Prior Publication Data

US 2022/0183908 A1 Jun. 16, 2022

Related U.S. Application Data

(60) Division of application No. 17/240,829, filed on Apr. 26, 2021, now Pat. No. 11,266,557, which is a (Continued)

(51) Int. Cl.

| | |
|---|---|
| ***A61G 7/10*** | (2006.01) |
| ***A61G 7/00*** | (2006.01) |
| ***A61G 7/057*** | (2006.01) |

(52) U.S. Cl.
CPC ........... *A61G 7/1021* (2013.01); *A61G 7/001* (2013.01); *A61G 7/05769* (2013.01); *A61G 7/1026* (2013.01); *A61G 7/1028* (2013.01)

(58) Field of Classification Search
CPC ...... A61G 7/10; A61G 7/1025; A61G 7/1026; A61G 7/1028; A61G 7/1021; A61G 7/001; A61G 7/05769
See application file for complete search history.

(56) References Cited

U.S. PATENT DOCUMENTS 2,781,820 A * 2/1957 Stanley .................. A41D 27/28
2/243.1
2,939,158 A 6/1960 Jack
(Continued)

FOREIGN PATENT DOCUMENTS

WO WO-00/04853 A1 2/2000
WO WO-2007/133589 A1 11/2007
(Continued)

OTHER PUBLICATIONS

International Search Report and Written Opinion for International Application No. PCT/US2017/032508, mailed Jul. 27, 2017, 14 pages.

*Primary Examiner* — David R Hare
*Assistant Examiner* — Amanda L Bailey
(74) *Attorney, Agent, or Firm* — FOLEY & LARDNER LLP

(57) ABSTRACT

A method of manufacturing a patient transfer system including obtaining an inflatable device, where the device includes a top sheet of material and a bottom sheet of material connected to the top sheet of material defining a cavity therebetween to be inflated. The device further includes a plurality of passages in the bottom sheet extending from the cavity to an exterior of the device, where the passages are configured to permit air to pass from the cavity to the exterior of the device. The device also including a plurality of inflation-limiting members connecting the top sheet and bottom sheet, and an input configured for receiving air to inflate the device. The method further includes providing an
(Continued)

absorbent body pad with the inflatable device, the absorbent body pad configured to be positioned between the top sheet of material and a patient positioned on the inflatable device.

9 Claims, 15 Drawing Sheets

Related U.S. Application Data continuation of application No. 15/594,195, filed on May 12, 2017, now Pat. No. 10,987,267.

(60) Provisional application No. 62/454,515, filed on Feb. 3, 2017, provisional application No. 62/428,984, filed on Dec. 1, 2016, provisional application No. 62/336,288, filed on May 13, 2016.

(56) References Cited

U.S. PATENT DOCUMENTS 4,266,298 A 5/1981 Graziano
4,267,611 A 5/1981 Agulnick
4,272,856 A 6/1981 Wegener et al.
4,483,030 A * 11/1984 Flick .................. A61G 7/05769 156/290
4,517,690 A 5/1985 Wegener
4,528,704 A 7/1985 Wegener et al.
4,685,163 A * 8/1987 Quillen ................ A47C 27/081 5/613
5,022,109 A 6/1991 Pekar
5,065,464 A 11/1991 Blanchard et al.
5,067,189 A 11/1991 Weedling et al.
5,103,518 A 4/1992 Gilroy et al.
5,199,121 A 4/1993 Payne
5,265,293 A 11/1993 Spahn et al.
5,561,873 A 10/1996 Weedling
5,604,945 A 2/1997 Fisher et al.
5,675,855 A 10/1997 Culp
5,679,040 A 10/1997 Bianchi-Holm
6,073,291 A 6/2000 Davis
6,102,936 A 8/2000 Augustine et al.
6,385,864 B1 5/2002 Sell et al.
6,709,447 B1 * 3/2004 Gammons ............ A61F 7/0097 607/104
6,966,275 B2 11/2005 Whitehill
7,065,815 B2 6/2006 Buchanan
7,266,852 B2 9/2007 Davis
7,426,766 B2 9/2008 Gammons
7,666,214 B2 * 2/2010 Pierre .................. A61F 7/0097 607/104
7,735,164 B1 6/2010 Patrick
8,317,849 B2 * 11/2012 Pierre ...................... A61F 7/08 607/107
8,608,788 B2 * 12/2013 Starr ......................... A61F 7/00 607/108
8,789,533 B2 7/2014 Steffens et al.
2002/0050010 A1 5/2002 Shimada
2003/0115670 A1 6/2003 Antinoro
2003/0159212 A1 8/2003 Patrick et al.
2005/0006437 A1 1/2005 Heckmeir et al.
2005/0034230 A1 2/2005 Weedling et al.
2005/0076437 A1 4/2005 Johnson
2005/0172412 A1 * 8/2005 Pearson ................. A47C 27/10 5/659
2006/0162086 A1 * 7/2006 Davis ................... A61G 7/1028 5/711
2007/0000048 A1 * 1/2007 Davis ................... A61G 7/1021 5/81.1 R
2007/0266494 A1 * 11/2007 DeLuca ............... A61G 7/1028 5/81.1 R
2008/0288034 A1 * 11/2008 Pierre .................. A61F 7/0097 607/107
2009/0295203 A1 * 12/2009 Lewis .................. A61G 5/1045 297/219.1
2012/0186012 A1 7/2012 Ponsi et al.
2012/0186013 A1 * 7/2012 Ponsi ..................... A61G 7/001 5/81.1 R
2012/0261911 A1 10/2012 Baca et al.
2013/0145549 A1 6/2013 Piegdon et al.
2013/0205495 A1 * 8/2013 Ponsi ................... A61G 7/1026 5/81.1 HS
2015/0186012 A1 7/2015 Coleman et al.
2017/0049646 A1 * 2/2017 Rigoni ............... A61G 7/05769

FOREIGN PATENT DOCUMENTS

WO WO-2008/005977 A2 1/2008
WO WO-2015/081271 A2 6/2015

* cited by examiner

PATIENT TRANSPORT APPARATUS

CROSS-REFERENCE TO RELATED PATENT APPLICATIONS

This application is a divisional of U.S. application Ser. No. 17/240,829, filed on Apr. 26, 2021, which is a continuation of U.S. application Ser. No. 15/594,195, filed on May 12, 2017, which claims the benefit of and priority to U.S. Provisional Application No. 62/336,288, filed May 13, 2016, U.S. Provisional Application No. 62/428,984, filed Dec. 1, 2016, and U.S. Provisional Application No. 62/454,515, filed Feb. 3, 2017. All of the aforementioned applications are hereby incorporated by reference in their entireties.

BACKGROUND

The present invention generally relates to an apparatus, system, and method for boosting, transferring, turning, and/or positioning a person on a bed or the like, and, more particularly, to an inflatable patient support device having a gripping surface, utilizing airflow and high and low friction surfaces to ease movement of a patient for transferring or other purposes, as well as systems and methods including one or more of such apparatuses.

Nurses and other caregivers at hospitals, assisted living facilities, and other locations often care for patients with limited or no mobility, many of whom are critically ill or injured and/or are bedridden. Caregivers often need to move patients to or from a bed surface for transport, treatment, or examination of the patient. As one example, patients undergoing surgery may need to be moved multiple times in the course of treatment, such as from a hospital bed to a stretcher to a treatment location (e.g., an operating table) and then back again. Patients who are unconscious, disabled, or otherwise unable to move under their own power often require the assistance of multiple caregivers to accomplish this transfer. The patient transfer process has traditionally relied upon one or more of several methods, including the use of folded bedsheets ("drawsheets") or rigid transfer boards in concert with the exertion of strong pushing or pulling forces by the caregivers to accomplish the move. The process may be complicated by the size of the patient, the patient's level of disability, and/or the patient's state of consciousness. Patients may be injured or feel discomfort in the course of such movement, particularly patients who have increased fragility, such as post-surgical patients.

In addition to being difficult and time-consuming, turning, positioning, transferring and/or boosting patients, types of "patient handling" activities, can result in injury to healthcare workers who push, pull, or lift the patient's body weight. For healthcare workers, the most prevalent cause of injuries resulting in days missed from work is overexertion or bodily reaction, which includes motions such as lifting, bending, or reaching and is often related to patient handling. These injuries can be sudden and traumatic, but are more often cumulative in nature, resulting in gradually increasing symptoms and disability in the healthcare worker.

In recognition of the risk and frequency of healthcare worker injuries associated with patient handling, safe patient handling procedures and/or protocols are often implemented in the healthcare setting. These protocols generally stress that methods for moving patients should incorporate a form of assistive device to reduce the effort required to handle the patient, thus minimizing the potential for injury to healthcare workers. Such assistance may be accomplished, for example, with the use of low-friction sheets or air assisted patient transfer devices that utilize forced air to reduce the physical exertion needed from healthcare workers to accomplish the task of moving a patient.

The present disclosure seeks to overcome certain of these limitations and other drawbacks of existing devices, systems, and methods, and to provide new features not heretofore available.

BRIEF DESCRIPTION OF THE DRAWINGS

To understand the present invention, it will now be described by way of example, with reference to the accompanying drawings in which.

DETAILED DESCRIPTION

Figure 1:
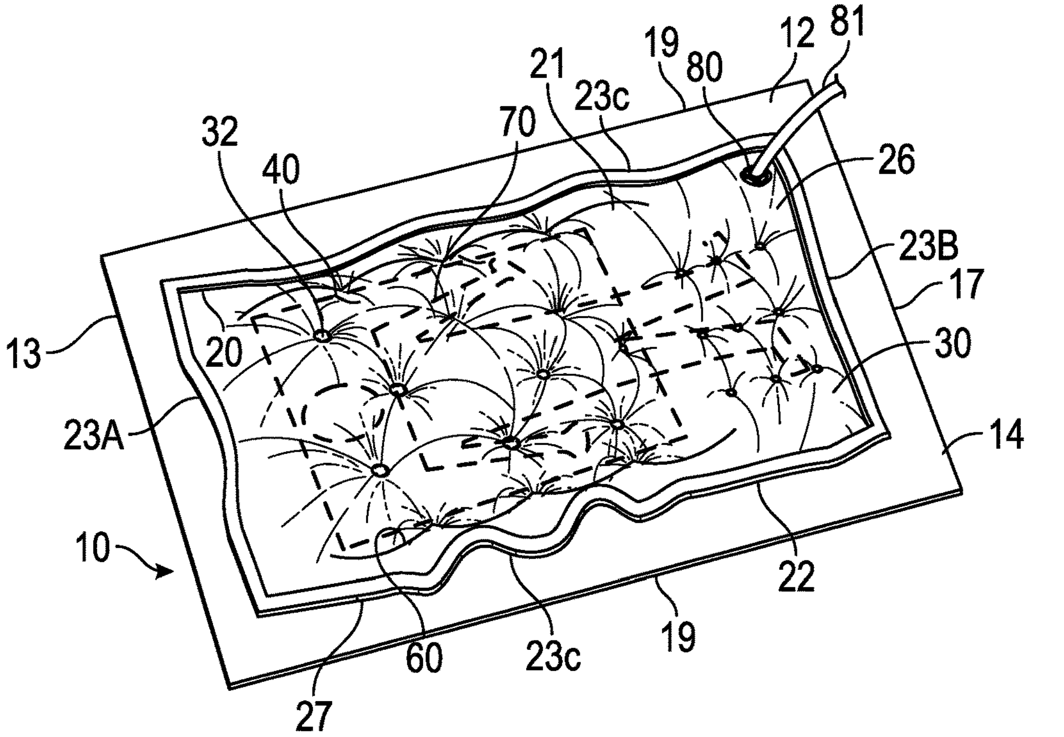
FIG. 1 is a top perspective view of one embodiment of a system for use in transferring a patient according to aspects of the disclosure, shown in an inflated state, with a patient and an absorbent body pad shown in broken lines.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, the disclosure relates to a system or apparatus, including an inflatable patient support device, an absorbent body pad configured to be placed over the device, and/or a pump or other air output for inflation of the device, as well as systems including one or more of such devices and methods utilizing one or more of such systems and/or devices. Various embodiments of the invention are described below. The system may be used for transferring, positioning, boosting, turning, or otherwise moving a patient on a support surface or between support surfaces.

Referring now to the figures, and initially to FIG. 1, there is shown an example embodiment of a system 10 for use in transferring a person resting on a surface 12, such as a patient lying on a hospital bed. As shown in FIG. 1, the system 10 includes an inflatable patient support device (hereinafter, "device") 20, an absorbent body pad 40 configured to be placed over the device 20, and an air output 81 configured for inflating the device 20. The patient can be positioned on top of the body pad 40, with the body pad 40 lying on the device 20, and with the device 20 lying on a supporting surface 12 (shown schematically in FIG. 1). The supporting surface 12 may be provided by a bed, gurney, stretcher, cot, operating table, or other support structure 14 for medical and/or patient care use, e.g., for supporting a person in a supine or other position. The support structure 14 and corresponding supporting surface 12 are not shown in detail, but may generally include known features of various support structures for medical and/or other patient care use, such as a frame and a supporting surface supported by the frame, and may have a head 13, a foot 17 opposite the head 13, and opposed sides or edges 19 extending between the head 13 and the foot 17. The support structure 14 may also include one or more bed sheets (such as a fitted sheet or flat sheet), as well as pillows, blankets, additional sheets, and other components known in the art. Further, the support structure 14 may be adjustable such that the head 13 (or other parts) of the support structure 14 can be raised and lowered, such as to incline the patient's upper body. It is understood that the system 10 and the components thereof can be used with many different types of support structures 14, and may be used to transfer a patient 70 from one support structure 14 to another support structure 14' of the same or a different type, as shown schematically in FIG. 7.

Example embodiments of the inflatable patient support device 20 are shown in greater detail in the figures. In general, the device 20 is flexible and foldable when in the non-inflated state, and has a top surface 21 and a bottom surface 22 defined by a plurality of peripheral edges 23. The device 20 is configured to be positioned on the supporting surface 12 so that the bottom surface 22 is above the supporting surface 12 and faces or confronts the supporting surface 12, and is supported by the supporting surface 12. As used herein, "above," "below," "over," and "under" do not imply direct contact or engagement. For example, the bottom surface 22 being above the supporting surface 12 means that that the bottom surface 22 may be in contact with the supporting surface 12, or may face or confront the supporting surface 12 and/or be supported by the supporting surface 12 with one or more structures located between the bottom surface 22 and the supporting surface 12, such as a bed sheet as described above. Likewise, "facing" or "confronting" does not imply direct contact or engagement, and may include one or more structures located between the surface and the structure it is confronting or facing.

As seen in a first embodiment of the device 20 shown in FIGS. 1-6, the device 20 in this embodiment has a generally rectangular shape, having four peripheral edges 23A-C, including a head edge 23A, a foot edge 23B, and two side edges 23C extending between the head and foot edges 23A-B. The shape of the device 20 may be different in other embodiments, including different shapes with varying degrees of symmetry. For example, in other embodiments of the device 20, shown in FIGS. 10-16, the device 20 has a generally rectangular shape but with a chamfered edge 23D extending between the head edge 23A and each side edge 23C. The device 20 in this configuration provides improvements during both inflation and deflation. During inflation, when the air enters the cavity 31, it inflates the periphery of the device 20 surrounding the patient first (described below), and then gently raises the patient above the support surface. Removing the corners, which creates the chamfered edges 23D, allows the inflation profile to be conformed more closely with the patient's anatomical contours. During deflation of the device 20, a configuration with chamfered edges 23D allows for more complete deflation. With the full rectangular configuration, when the device 20 is deflating, air will remain near the head. By removing the corners, which creates the chamfered edges 23D, the weight of the shoulders and head of the patient are sufficient to adequately deflate the cavity 31 of air.

The device 20 generally includes an inflatable body 30 that defines an internal cavity 31 configured to be inflated with air or another gaseous substance. The inflatable body 30 is defined by at least a top sheet 26 forming a top wall of the cavity 31 and a bottom sheet 27 forming a bottom wall of the cavity 31, with the top sheet 26 and the bottom sheet 27 connected together to define the cavity 31 between them. In the embodiment shown in FIGS. 1-6, 8, and 10-16, the top and bottom sheets 26, 27 are two separate pieces of sheet material that are connected together around their peripheries, such as by stitching and/or adhesives, or one or more other connection techniques described herein. In other embodiments, the top and bottom sheets 26, 27 may be connected to one another by a side wall or a plurality of side walls made from a flexible or rigid material attached to each sheet at their peripheries. In other embodiments, the top and bottom sheets 26, 27 may be made from a single piece of material that is folded over and connected by stitching along the free ends or that is formed in a loop, or the top and/or bottom sheets 26, 27 may be formed of multiple pieces. Both the top and bottom sheets 26, 27 may be formed of the same material in one embodiment, although these components may be formed of different materials in another embodiment. It is understood that either or both of the sheets 26, 27 may have a single layer or multiple layers that may be formed of the same or different materials.

Additionally, the sheet material(s) of the top and bottom sheets 26, 27 may have properties that are desirable for a particular application. Some exemplary characteristics for a selected material include favorable breathability, durability, imagining compatibility, flammability, biocompatibility, pressure distribution profile, heat transmission, electrical conductivity, and cleaning properties. For example, if the device 20 is intended to be left beneath the patient 70 for an extended period of time, the sheets 26, 27 may be breathable fabrics or other materials that have sufficient breathability to allow passage of heat and moisture vapor away from the patient, while also having sufficient resistance to air passage to retain inflation of the inflatable body 30. As another example, when the device 20 is used solely as a patient transfer device that is not left beneath a patient for an extended period of time, breathability may not be a primary concern when selecting a material for the sheets 26, 27. In such an embodiment, factors such as durability, ease of cleaning, liquid repellence, and cost may be properties of primary concern. Some examples of materials suitable for use in constructing the sheets 26, 27 that meet these criteria but do not provide a high degree of breathability include woven polyester and non-woven polypropylene. The material(s) of the top and bottom sheets 26, 27 may also include specific frictional properties, as described herein. Additionally, if the device 20 is designed to be breathable, the material of the top and bottom sheets 26, 27 may have greater permeability to water vapor (i.e., breathability) than its permeability to liquid or air. As an example, the top and/or bottom sheets 26, 27 may be formed of a material that is liquid repellant and/or impermeable and may have little to no air permeability, while being permeable to moisture vapor, such as polyester and/or nylon (polyamide). Some materials may further include an additive, such as coatings, laminates, and the like. For example, a coated nylon taffeta material is one example of a material which can provide these properties, and further, the coating on such a material may have a higher coefficient of friction than the sheet material itself, creating a configuration with a high-friction material 24 (the coating) on one surface and a low-friction material (the sheet material with or without an additive) on the opposite side, as described in greater detail elsewhere herein. The additives to the material may provide one or more of the following: decreasing the static potential (as described below), increasing the coefficient of friction of the top sheet, and decreasing the coefficient of the bottom sheet.

In some embodiments, static electrical potential may form in the device 20 due to friction caused by airflow through the device 20, sliding between the top and bottom sheets 26, 27, and/or sliding the device 20 against the supporting surface. This static potential can create significant electrical shocks in some situations. In order to avoid this effect, an anti-static additive may be applied to the top and bottom sheets 26, 27, either as a material additive or as a coating (e.g., a spray or brush-on coating). Another technique for avoiding this effect is to use conductive stitching between the top and bottom sheets 26, 27, such as to form the stitches 33, 61 defining the inflation-limiting structures 32, 60 described elsewhere herein. In yet another embodiment, the surfaces of the top and/or bottom sheets 26, 27 that face in towards the cavity 31 may be laminated or coated with urethane, PVC, or other material having similar properties. Coating or covering the sheets 26, 27 with such materials may result in a reduction the static discharge potential of the sheets 26, 27. In another example, conductive threads may be used in the stitching of the device 20 to ground the apparatus. Other static-reducing techniques may be used in other embodiments.

In one preferred embodiment, the top and bottom sheets 26, 27 are both a nylon taffeta sheet material. The surfaces of the top and bottom sheets 26, 27 that face in towards the cavity 31 are coated with urethane. The top sheet 26 has on its top face (outward facing) a urethane laminate additive. In a second preferred embodiment, the top and bottom sheets 26, 27 are both a nylon taffeta sheet material. The top surface of the bottom sheet 27 that faces in towards the cavity 31 has a PVC coating. The top sheet 26 has on its top face (outward facing) a polyurethane additive. In other preferred embodiments other combinations of the above materials may be used for the top and bottom sheets 26, 27. Materials such as these provide an additional benefit of imaging capability. With some materials and manufacturing processes, radiographic artifacts from the device may appear in and distort images. The materials and manufacturing processes selected for device 20 preferably will not present any radiographic artifact.

The inflatable body 30 of the device 20 may include one or more inflation-limiting structures to create a specific inflated shape 20 for the device. In general, an inflation-limiting structure is a structure connected to the top and bottom walls of the cavity 31 (e.g., the top and bottom sheets 26, 27) that limits the degree to which the top and bottom walls can move apart from each other during inflation. In the embodiment illustrated in FIGS. 1-6, 8, and 10-16, the inflatable body 30 has a plurality of connection areas 32 between the top sheet 26 and the bottom sheet 27 to form inflation-limiting structures. The connection areas 32 in this embodiment are circular in shape and are formed by stitching the top and bottom sheets 26, 27 together by stitches 33 arranged a circular shape in a plurality of locations. In some embodiments, the top and bottom sheets 26, 27 are stitched together by stitches 33 arranged in two or more concentric circles for reinforcement and strength of the connection area 32. In some embodiments, the stitches 33 of a connection area 32 are arranged in three concentric circles. Stitching in three concentric circles provides the added benefit of decreasing the volume of air capable of residing within the circular stitch which could lead to stitch failure, and also minimizes the air flow through the stitch holes.

The stitches 33 may also extend through the high friction material 24 or other components positioned adjacent the top and/or bottom sheets 26, 27. The connection areas 32 may be formed by stitching arranged in different shapes, and/or a different connection method (e.g., adhesive, sealing, etc.) may be used instead of or in addition to the stitching, in other embodiments. In general, the cavity 31 is effectively unable to expand fully (or at all in some circumstances) during inflation at the location of or near each connection area 32, and the connection areas thereby act as inflation-limiting structures. The areas between the connection areas 32 form swells 36 when the device 20 is inflated, and the sizes of the swells 36 may depend on factors such as the configuration, orientation, and spacing of the connection areas 32 or other inflation limiting structures. For example, the greater the distance between a connection area 32 and the next nearest connection area 32, the larger the swell created between the two. In this way, larger swells can be formed in certain portions by arranging the connection areas farther apart, as with the outer bolsters described later herein. In other embodiments, separate inflation-limiting structures may be used to connect the top and bottom sheets 26, 27, such as columns, gussets, baffles, etc., which may be connected to the top and bottom sheets 26, 27 and extend across the cavity 31. Any inflation limiting structures, including the connection areas 32, may have various different configurations in other embodiments, including linear, polygonal, and various curved or angular shapes.

The fully inflated device 20 has a shape that is defined by the configuration of the edges 23A-C (as in FIGS. 1-6 and 8) or edges 23A-D (as in FIGS. 10-16) of the device 20, and the arrangement of the inflation-limiting structures, among other factors. The arrangement of the connection areas 32 (i.e., spacing, locations, and orientations with respect to each other) may influence the degree of inflation that occurs locally around each connection area 32, and the connection areas 32 may be arranged in various patterns to accomplish specific desired shapes and characteristics of the device 20 upon inflation.

For example, in the embodiment of FIGS. 1-6, the connection areas 32 are arranged in a first pattern 38 in a portion of the device 20 more proximate to the head edge 23A and a second pattern 39 in a portion of the device 20 more proximate to the foot edge 23B, which second pattern 39 is different from the first pattern 38. The connection areas 32 in the first pattern 38 are arranged in a plurality of jogged structures, with two connection areas 32 being generally aligned along a lateral line (i.e., parallel to the head and/or foot edges 23A-B) and a third connection area 32 being offset from that lateral line. Viewed another way, the connection areas 32 in the first pattern 38 are arranged in three longitudinal columns (i.e., extending between the head and foot edges 23A-B) of equally-spaced connection areas 32, with the center column being offset longitudinally from the left and right columns. The connection areas 32 in the second pattern 39 are arranged in a plurality of parallel lateral and longitudinal lines. In this embodiment, the second pattern 39 is arranged with three parallel lateral lines and three parallel longitudinal lines of connection areas 32. The connection areas 32 in the second pattern 39 are spaced more closely to each other compared to the first pattern 38, which allows the swells 36 in the area of the first pattern 38 to inflate to a larger degree than in the area of the second pattern 39. In this configuration, the top surface 21 of the device 20 in the area of the first pattern 38 is slightly raised with respect to the area of the second pattern 39 when inflated, creating greater lift and support for the head and upper body of the patient 70 when resting on the inflated device 20.

In another example, in the embodiments of FIGS. 10-16, the connection areas 32 are also arranged in a first pattern 138 in a portion of the device 20 more proximate to the head edge 23A and a second pattern 139 in a portion of the device 20 more proximate to the foot edge 23B, where the second pattern 139 is different from the first pattern 138. Similar to first pattern 38 in the embodiment of FIGS. 1-6, the connection areas 32 in the first pattern 138 are arranged in a plurality of jogged structures, the jogged structures having two connection areas 32 being generally aligned along a lateral line (i.e., parallel to the head and/or foot edges 23A-B) and a third connection area 32 being offset from that lateral line. Viewed another way, the connection areas 32 in the first pattern 138 are arranged in three longitudinal columns (i.e., extending between the head and foot edges 23A-B) of equally-spaced connection areas 32, with the center column being offset longitudinally from the left and right columns. The connection areas 32 in the second pattern 139 are arranged in parallel lateral and longitudinal lines. In this embodiment, different from the embodiment of FIGS. 1-6, the second pattern 139 is arranged with four parallel lateral lines and three parallel longitudinal lines of connection areas 32.

The connection areas 32 of the upper jogged structure are spaced at a distance from the head edge 23A that is greater than the space between the upper jogged structure and the next jogged structure. In this way, a larger swell is created near the head edge, which provides a head support portion for a patient on the device 20. The head portion is higher than the area of the first pattern 138. Likewise, the connection areas 32 in the second pattern 139 are spaced more closely to each other compared to the first pattern 138, which allows the swells 36 in the area of the first pattern 138 to inflate to a larger degree than in the area of the second pattern 139. In this configuration, the top surface 21 of the device 20 in the head portion is slightly raised with respect to the area of the first pattern 138, and further, the area of the first pattern 138 is slightly raised with respect to the area of the second pattern 139 when inflated, creating greater lift and support for the head and upper body of the patient 70 when resting on the inflated device 20.

In the embodiments of FIGS. 1-6, 8, and 10-16, the outward-most connection areas 32 are spaced farther from the edges 23A-C of the device 20 than they are spaced from other connection areas 32, thereby allowing the areas around the edges 23A-C of the device 20 to inflate to a greater degree. This arrangement of the connection areas 32 creates a bolster or peripheral cushion 34 that is inflated to a greater degree relative to the central area 35 of the device 20 where the connection areas 32 are arranged closer together. The peripheral cushion 34 extends around at least some of the edges 23A-C of the device 20, and the central area 35 is at least partially surrounded by the peripheral cushion 34. In the embodiments shown, the peripheral cushion 34 extends along all edges 23A-C of the device 20 so that the central area 35 is surrounded on all sides by the peripheral cushion 34. The raised configuration of the peripheral cushion 34 with respect to the central area 35 can resist sliding or rolling of the patient 70 off of the device 20 when the device is inflated.

In this configuration, during inflation, air moves around the periphery first to raise the bolsters or peripheral cushion 34 and supports the patient. This is due in part to the larger spaces between the connection areas 32, 32' and therefore, provides a path of least resistance for the flow of air. Air then moves into the central area 35 to lift the patient from the support surface. The inflation of the peripheral cushion 34 first provides additional comfort and security to the patient while they are being lifted above the support surface, and also can "self-center" the patient if the patient has been positioned off-center on the device or non-parallel to the device sides. The comfort and security of the patient is improved by having the peripheral cushion and other areas, for example the head portion, that are raised higher than other areas while the device remains inflated. The inflation of the peripheral cushion 34 before the central portions also allows for quicker inflation of the device as compared with other devices that have a uniform inflation profile due to the less tortuous path for the air to follow. Finally, due to the configuration of the peripheral cushion and the inclination for the cushion portions to form first, the device 20 can automatically straighten, unfold, uncurl, etc. when inflation begins. For example, if a portion of the device 20 is folded under itself, it will automatically correct and flatten out at the onset of inflation.

Figure 2:
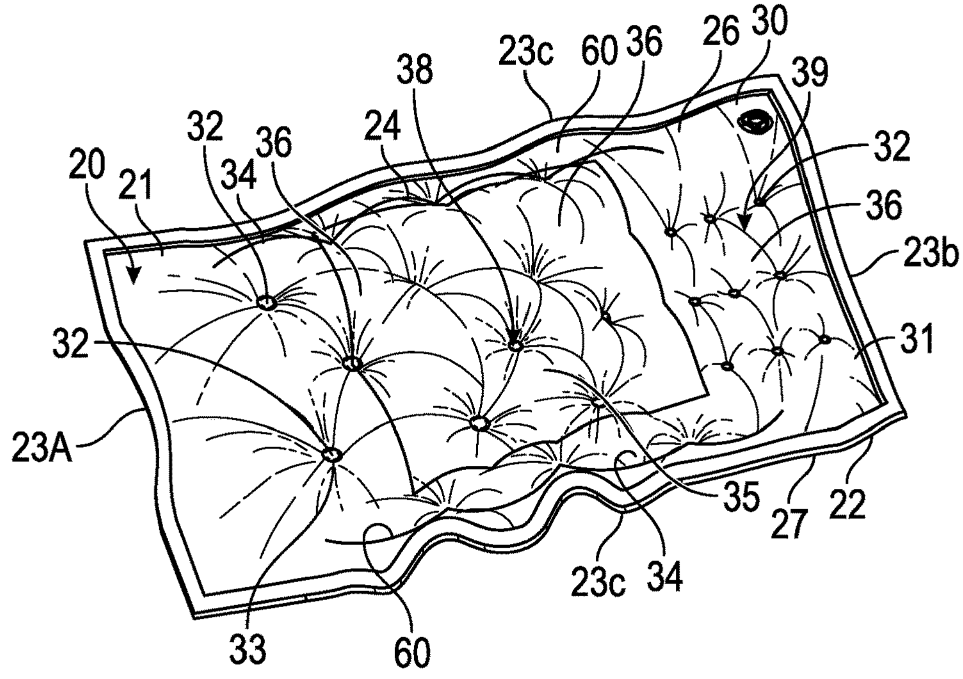
FIG. 2 is a top perspective view of an inflatable patient support device of the system of FIG. 1, shown in the inflated state.
Figure 3:
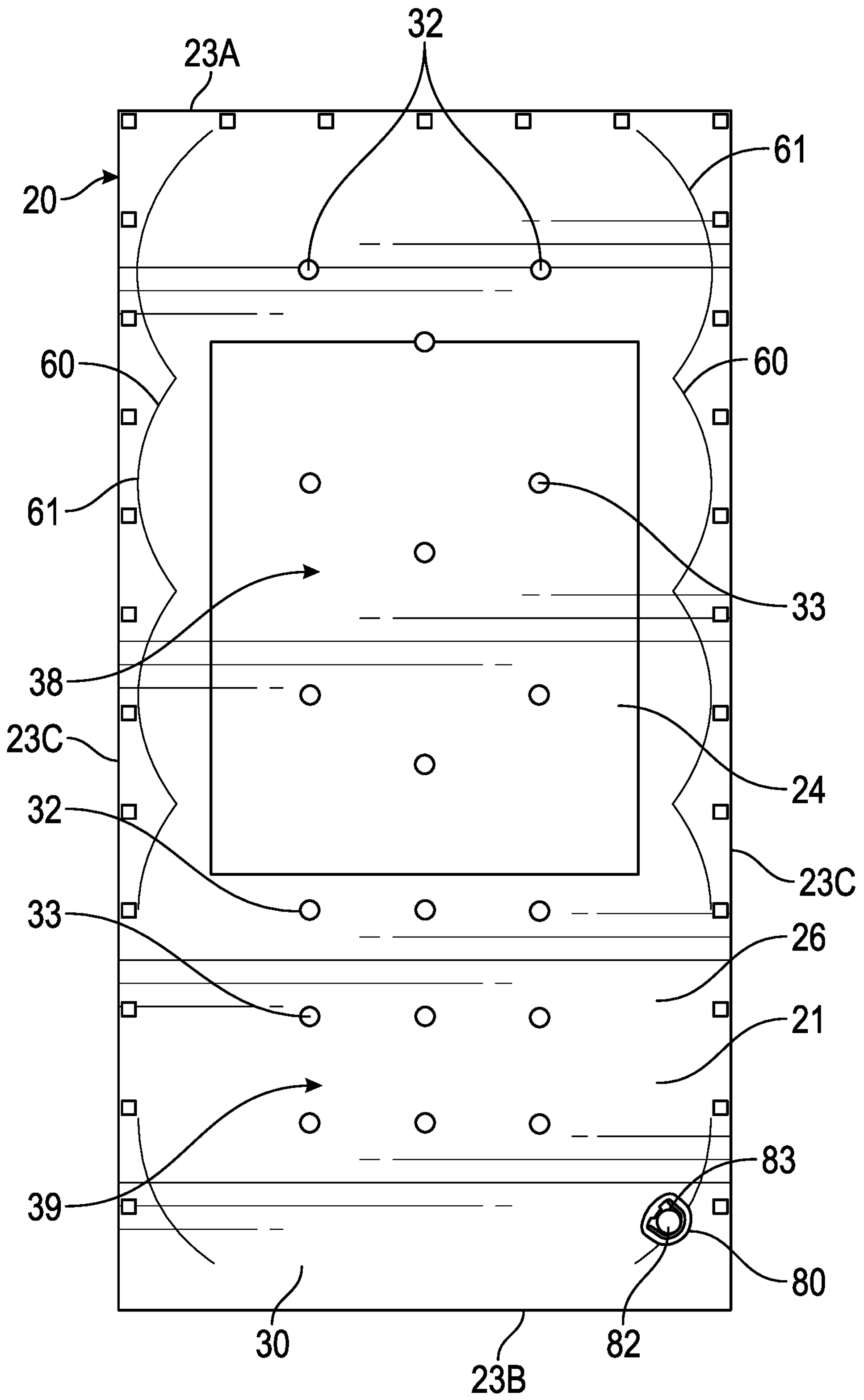
FIG. 3 is a top plan view of the inflatable patient support device of FIG. 2, shown in a non-inflated state.

The device 20 illustrated in FIGS. 1-6 has additional inflation-limiting structures in the form of connection lines 60 that extend along the edges 23A-C of the device 20. The device 20 shown in FIGS. 1-6 has connection lines 60 extending along the side edges 23C of the device 20, but the connection lines 60 may extend along the head and foot edges 23A-B in another embodiment. The connection lines 60 in FIGS. 1-6 are formed by stitching between the top and bottom sheets 26, 27, in the form of arc-shaped stitches 61. The arc-shaped connection lines 60 in the embodiment of FIGS. 1-6 are generally configured as circular arcs formed with a constant radius based on a center that is located at the center of the nearest connection area 32 to the arc. In one embodiment, the radius of the arc is defined by the distance from the center (i.e., the most proximate connection area 32) to the nearest lateral edge of the cavity 31, which may be located inwardly from the side edges 23C of the device 20, due to stitching or other connections at the edges 23C to connect the top and bottom sheets 26, 27 together and/or to connect the strips 29 forming the handles 28. In other embodiments, the connection lines 60 may have a different configuration. The connection lines 60 in the embodiment of FIGS. 1-6 are configured to restrict or prevent airflow through the stitches 61 toward the side edges 23C of the device 20, and thus, portions of the device 20 located between the connection lines 60 and the side edges 23C of the device 20 may either not inflate or inflate to a minimal degree during inflation, in one embodiment. As a result, the connection lines 60 in this embodiment define the external contours of the inflated device 20. As shown in FIGS. 1 and 2, the inflated device 20 has a scalloped edge contour near the side edges 23C of the device 20. This configuration, particularly the constant radius between the nearest connection area 32 and the connection line 60, helps to avoid the side edges 23C from curling upward and inward toward the center of the device 20 when the device 20 is inflated, which tends to occur if the connection lines 60 are not present. It is understood that connection lines 60 similar to those shown in FIGS. 1-6 may be formed using a different type of connection technique or a different type of inflation-limiting structure, including various different configurations described elsewhere herein.

Figure 8:
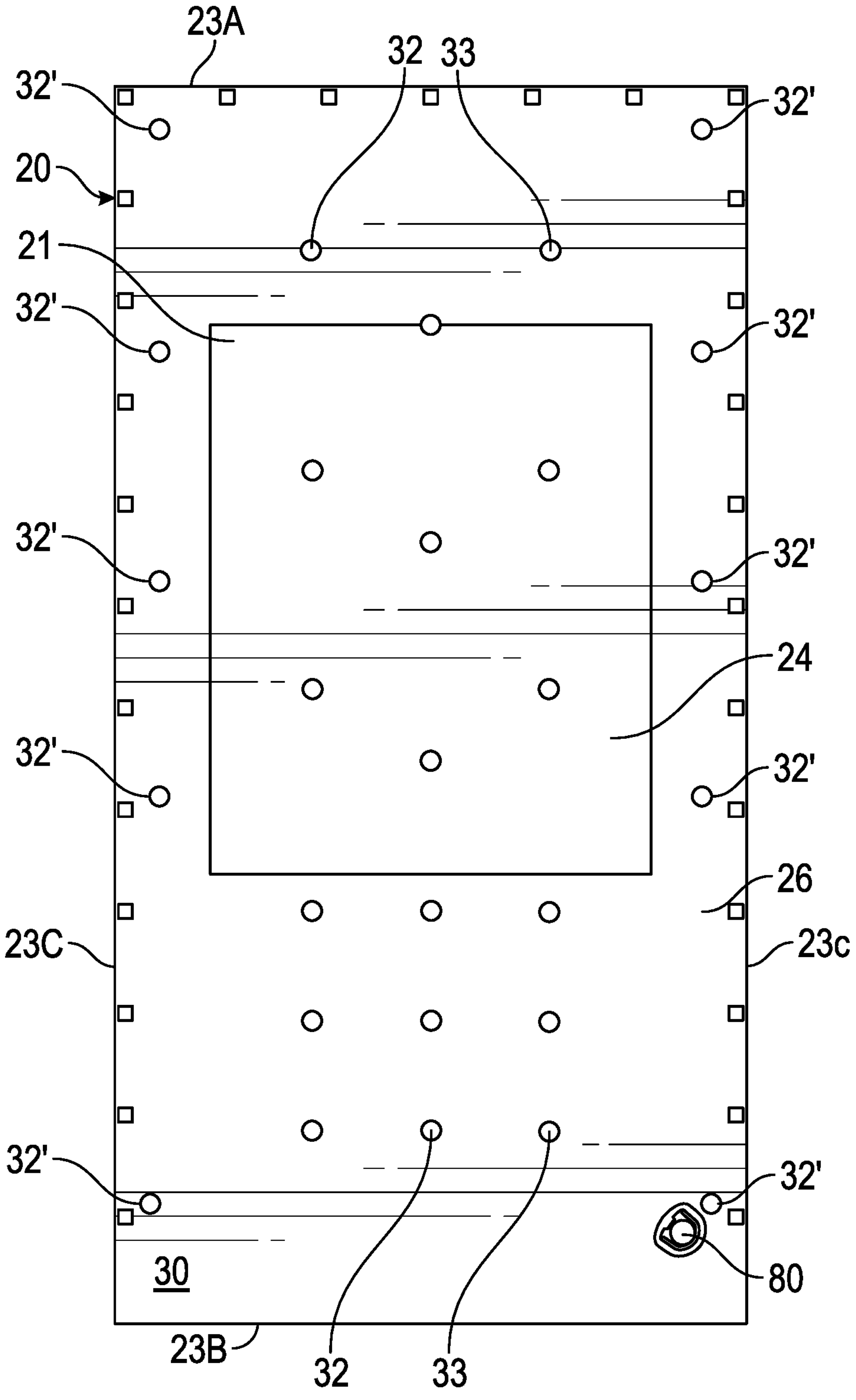
FIG. 8 is a top plan view of a second embodiment of an inflatable patient support device according to aspects of the disclosure that is usable in connection with the system of FIG. 1, shown in a non-inflated state.

In other embodiments, inflation-limiting structures with different configurations may be used to achieve a similar effect to the connection lines 60 in FIGS. 1-6. For example, FIG. 8 illustrates another embodiment of a device 20 where the connection lines 60 are replaced by additional connection areas 32' that are structured similarly to the connection areas 32 described above. The additional connection areas 32' in this embodiment are located along the side edges 23C of the device 20 and create an edge contour that is scalloped similarly to the edge contour of the embodiment of FIGS. 1-6. In other words, each additional connection area 32' is positioned from the nearest connection area at a uniform distance, thereby replicating the uniformed diameter of the arc-shaped connection lines 60. Without the additional connection area 32' or the connection line 60 at the predetermined diameter, the portions with a greater distance between the connection area 32 and the edge of the device tend to twist or curl upward or downward and inward when inflated. Thus, the connection line 60 and/or additional connection area 32' maintain a uniform distance between the connection area 32 and the next connected portion (either connection area 32' or connection line 60) to minimize or prevent the curling and twisting.

The additional connection areas 32' of FIG. 8 are arranged in a first pattern along a length of the side edges towards the head of the device 20. The first pattern includes additional connection areas 32' that are uniformly spaced apart. In this embodiment, there are four additional connections areas 32' on each edge 23C in the first pattern, forming three scallops as in the embodiment of FIGS. 1-6. However, any number of additional connections areas 32' in the first pattern and any number of resulting scallops may be formed in the device 20. These additional connection areas 32' may be spaced substantially equally from the two nearest connection areas 32, thereby partially defining an arc-shape in the inflated device 20, in a similar manner to that described above with respect to the embodiment of FIGS. 1-6. Further additional connection areas 32' are located near the bottom corner (between the sides edges 23C and the foot edge 23B) to create one further scallop near the foot 17 of the device 20, in a similar manner to that described above with respect to the embodiment of FIGS. 1-6.

In another example, FIGS. 10-16 illustrate another embodiment of a device where the connection lines 60 are replaced by additional connection areas 32' that are structured similarly to the connection areas 32 described above and function similarly to those described above with reference to FIG. 8. The additional connection areas 32' in this embodiment are also located along the side edges 23C of the device 20. In this embodiment, the additional connection areas 32' are arranged along a length of the side edges 23C towards the head of the device 20. The additional connection areas 32' are uniformly spaced apart. In this embodiment, there are three additional connection areas 32' along the side edges 23C. However, any number of additional connections areas 32' and any number of resulting scallops may be formed in the device 20.

It is understood that other features of the device 20 in FIGS. 8 and 10-16 may be similar or identical to the features described and shown herein with respect to the embodiment of FIGS. 1-6. It is also understood that the device 20 shown in any of the figures can utilize any additional or alternate features or components described herein with respect to other embodiments.

Other inflation characteristics can be achieved by different arrangements of connection areas 32, connection lines 60, or other inflation limiting structures in other embodiments. It is understood that if other types of inflation-limiting structures are used instead of the stitched connection areas 32 and connection lines 60 as illustrated in FIGS. 1-6, or the stitched connection areas 32 and additional connection areas 32' as illustrated in FIGS. 8 and 10-16, these other inflation-limiting structures may be arranged to create various inflation characteristics as described herein, including arrangements similar or identical to the arrangements of the connection areas 32, connection lines 60, and/or additional connection areas 32' shown in FIGS. 1-6, 8, and 10-16. It is also understood that the inflated device 20 may have a different shape when under force, e.g., when a patient 70 is positioned on top of and compressing the device 20.

The device 20 illustrated in FIGS. 1-6, 8, and 10-16 includes a plurality of passages 37 in the bottom sheet 27 that permit air to pass from the cavity 31 to the exterior of the device 20. The passages 37 extend from the cavity 31 through the bottom sheet 27 to the exterior of the device 20. Air passing through the passages 37 is forced between the bottom surface 22 of the device 20 and the surface upon which the device 20 sits (e.g., the supporting surface 12), reducing friction between the bottom surface 22 and the supporting surface 12. This permits easier movement of the device 20 when a patient 70 is positioned on the device 20, as described in greater detail elsewhere herein. In various embodiments, the passages 37 have a diameter in the range of 0.6 mm to 1.2 mm, or any range therebetween. In some embodiments, the passages 37 have a diameter in the range of 0.75 mm to 1.05 mm, or any range therebetween. In some embodiments, the passages 37 have a diameter of approximately 0.9 mm. In some embodiments, the passages 37 have a diameter of approximately 1.0 mm. The diameter of the passages impacts, at least partly, the effectiveness of the device 20 for maneuvering a patient. For example, if the passages are too small, they may not allow enough air to pass through and will not be effective in decreasing the friction between the bottom surface 22 and the surface upon which it sits. On the other hand, if the passages are too large, too much air will pass through and the device 20 will partially or wholly deflate, also minimizing the effectiveness of the device 20.

As stated above, the passages 37 of the device 20 are intended to pass air between the bottom surface 22 of the device 20 and the surface upon which the device 20 sits. The effectiveness of these passages 37 in doing so is also impacted by the arrangement of the passages 37 in the bottom sheet 27. Several exemplary arrangements are shown in the figures, and described below. Generally, the passages 37 are arranged entirely, or more densely, in areas of the bottom sheet 27 that are in contact areas, where the bottom sheet 27 contacts the supporting surface when the device 20 is inflated and supporting a patient. The device 20 may also have non-contact areas. In particular, when the device 20 is inflated, the connection areas 32 and the areas surrounding them are drawn in towards the cavity 31 when inflated (due to the top sheet 26 and bottom sheet 27 being sewn together in these areas) and the bottom sheet 27 in these areas does not contact the surface. Accordingly, passages 37 positioned in this area would not be as effective for the intended purpose. Thus, it is preferred that all or most of the passages 37 are arranged in areas in between and spaced at a distance from the connection areas 32, which are the areas that are in contact with the surface when the device is inflated and supporting a patient.

Figure 4:
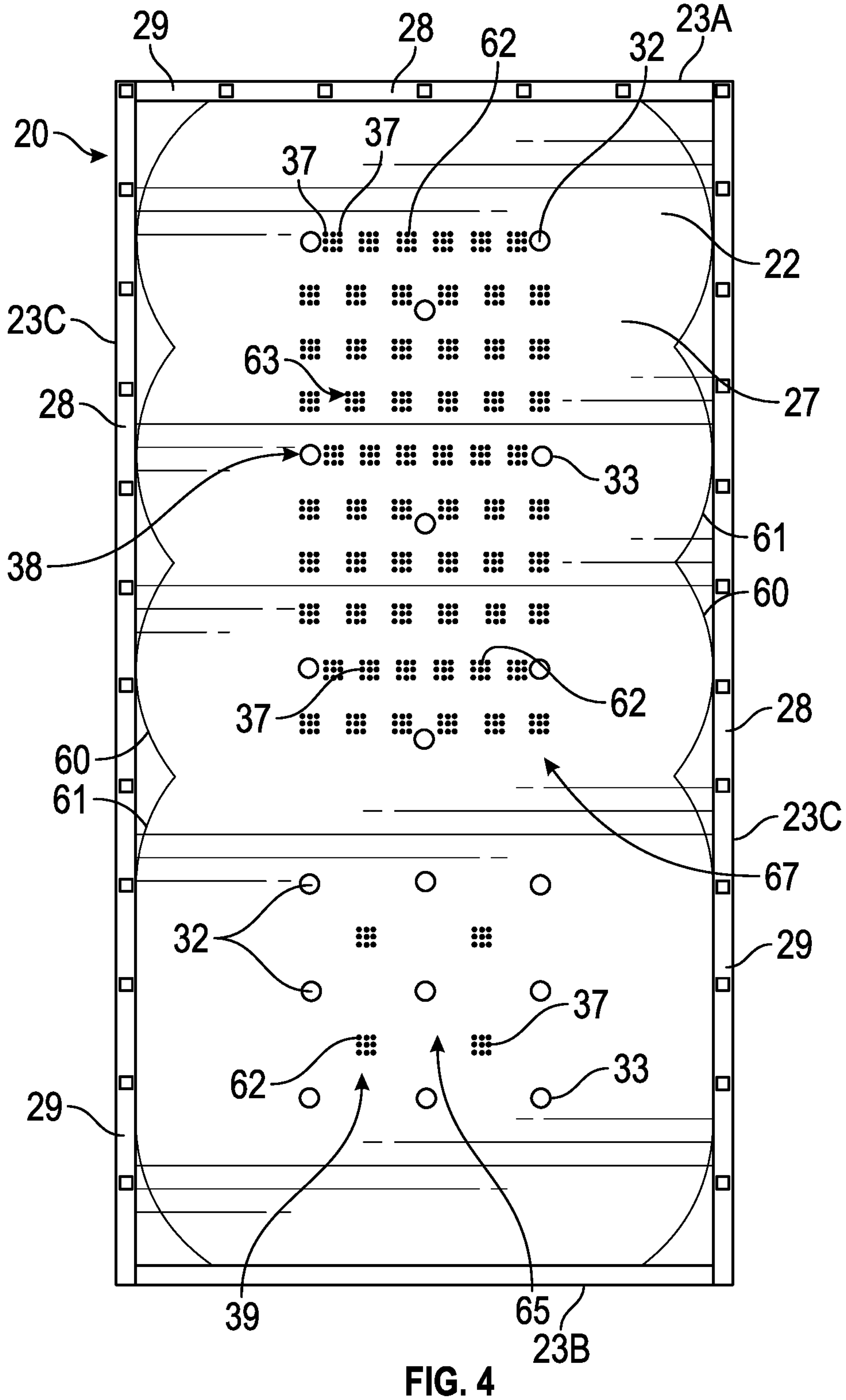
FIG. 4 is a bottom plan view of the inflatable patient support device of FIG. 2, shown in the non-inflated state.
Figure 5:
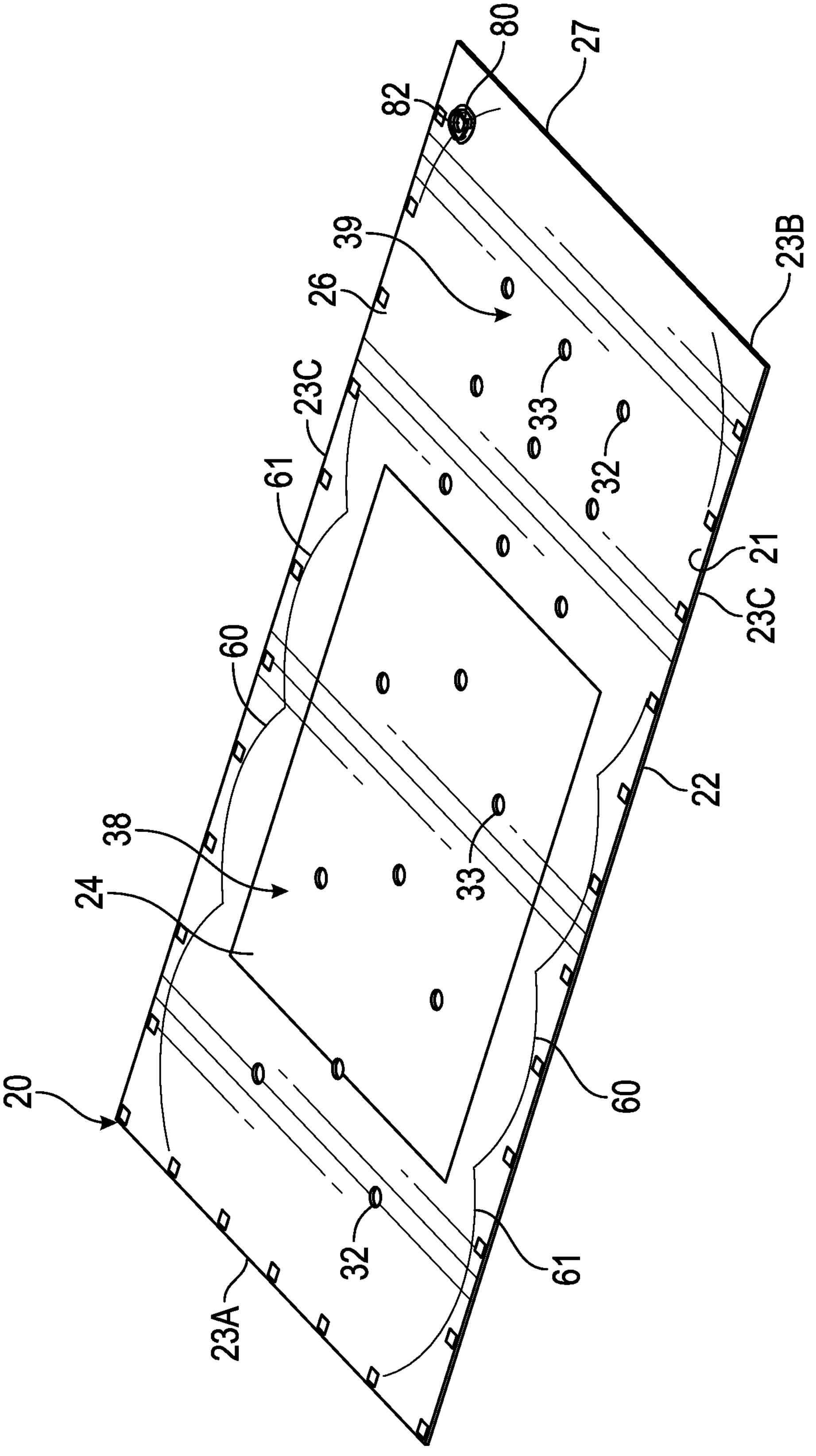
FIG. 5 is a top perspective view of the inflatable patient support device of FIG. 2, shown in the non-inflated state.
Figure 6:
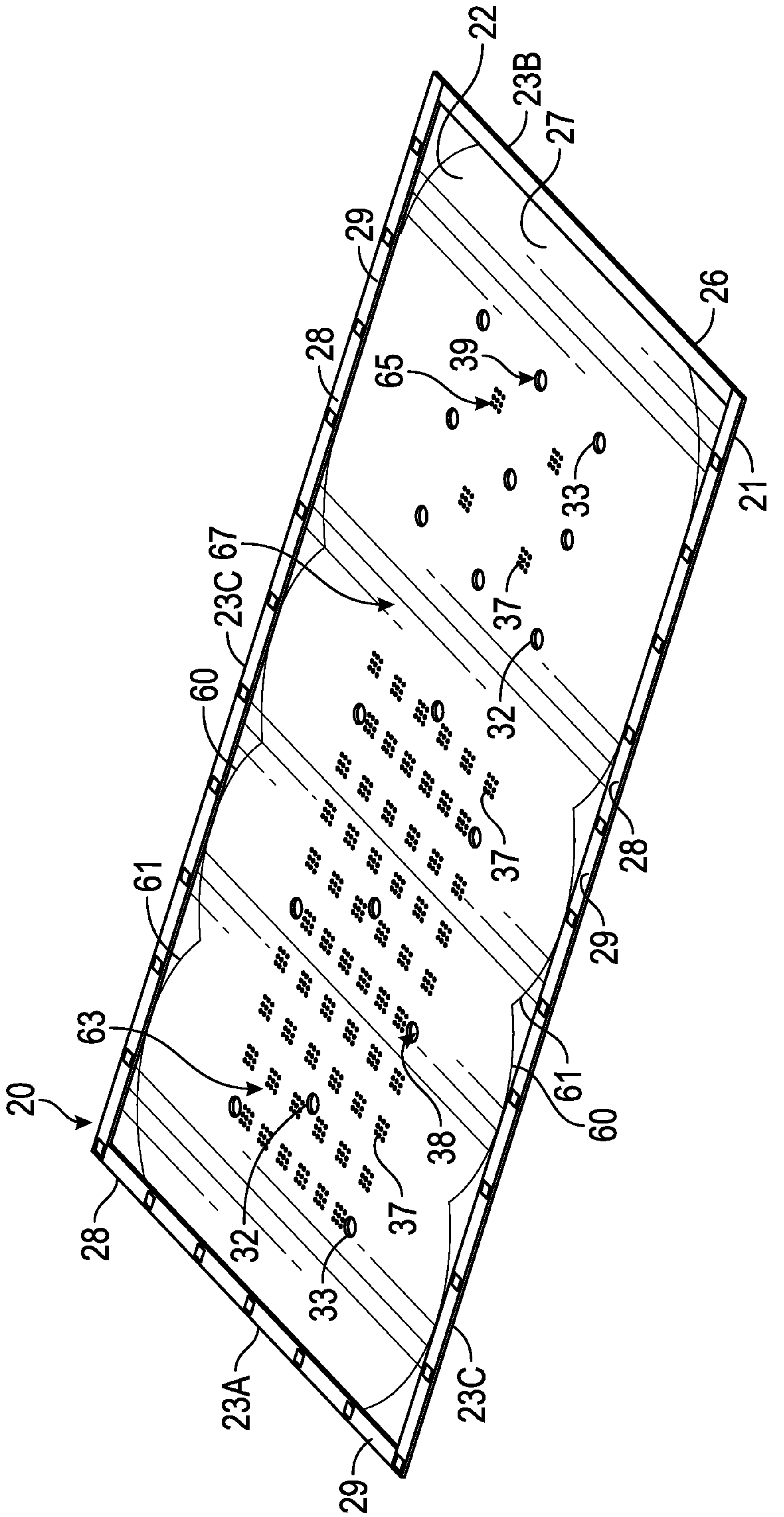
FIG. 6 is a bottom perspective view of the inflatable patient support device of FIG. 2, shown in the non-inflated state.

FIGS. 4 and 6 illustrate the passages 37 in a first embodiment. The passages 37 in the embodiment of FIGS. 1-6 are located within the central area 35 on the bottom surface 22 and are dispersed across the bottom surface. As shown in FIGS. 4 and 6, the passages 37 in this embodiment are arranged in groups 62 that are distributed across the bottom sheet 27. Each group 62 in this embodiment includes nine passages arranged in a symmetrical square arrangement, and the groups 62 are arranged in a plurality of laterally-extending rows. In other embodiments, the passages 37 may be shaped, located, and/or configured differently, such as by using more or fewer passages that are smaller or larger in size.

Figure 13:
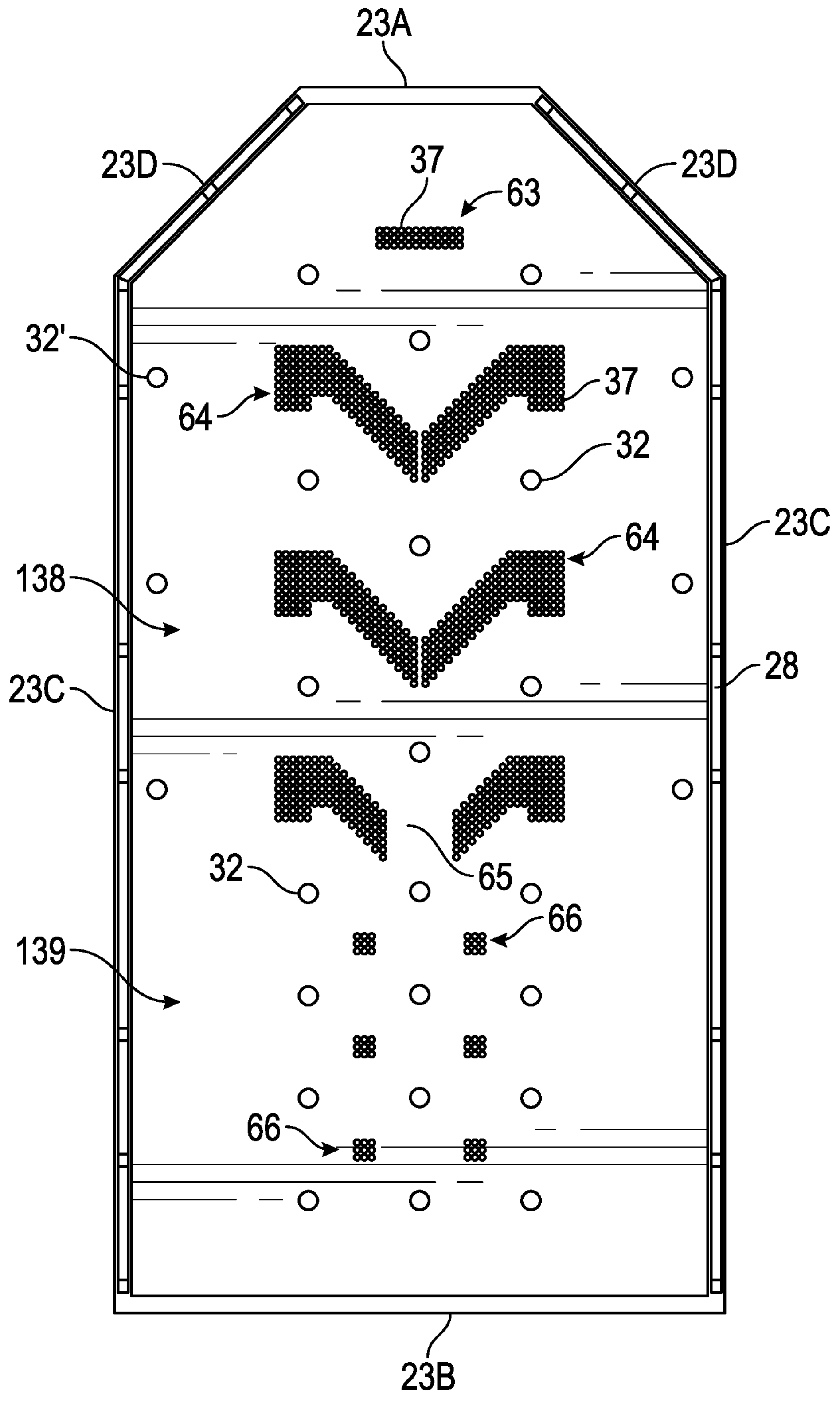
FIG. 13 is a bottom plan view of the inflatable patient support device of FIG. 10, shown in the non-inflated state.
Figure 14:
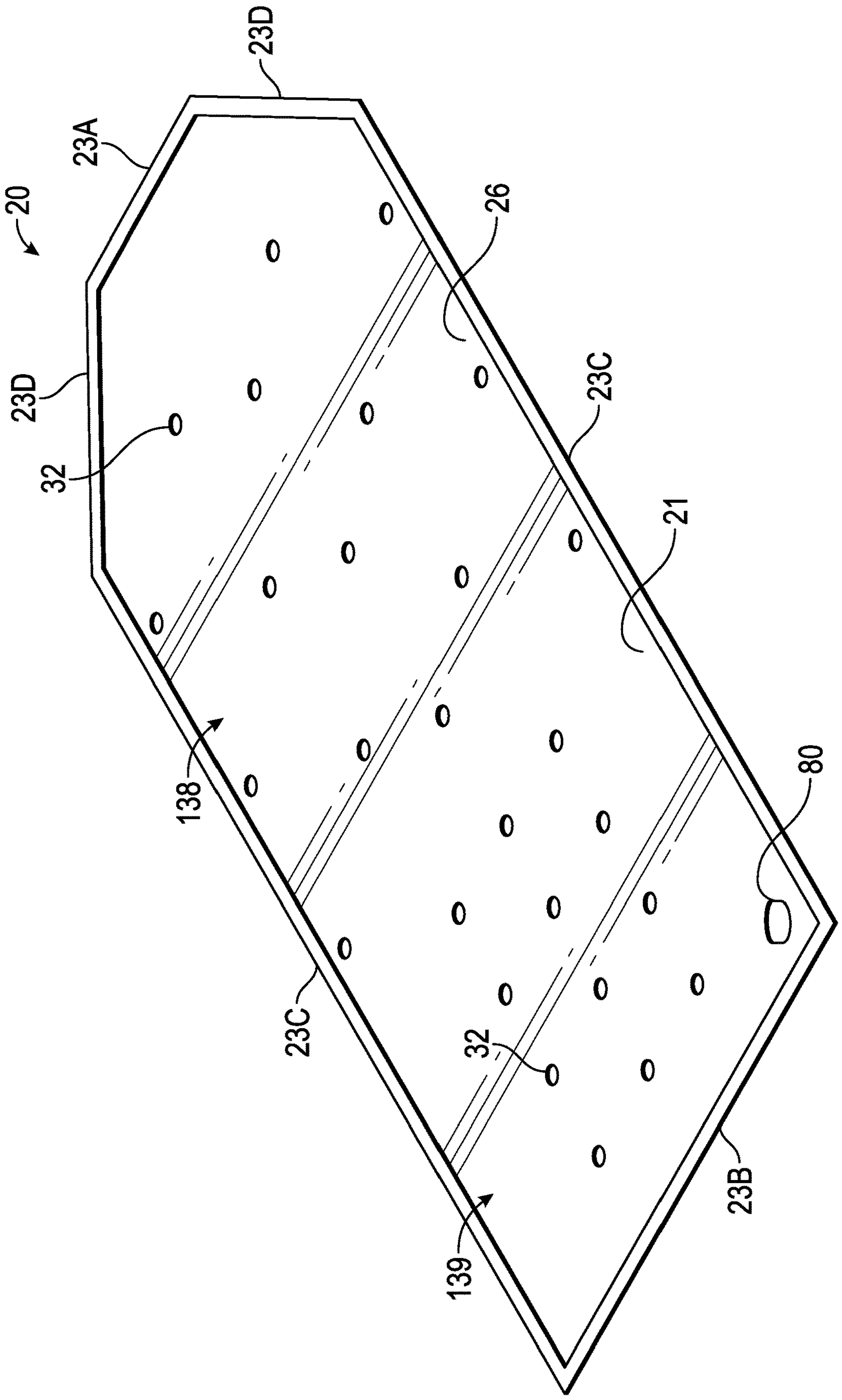
FIG. 14 is a top perspective view of the inflatable patient support device of FIG. 10, shown in the non-inflated state.
Figure 15:
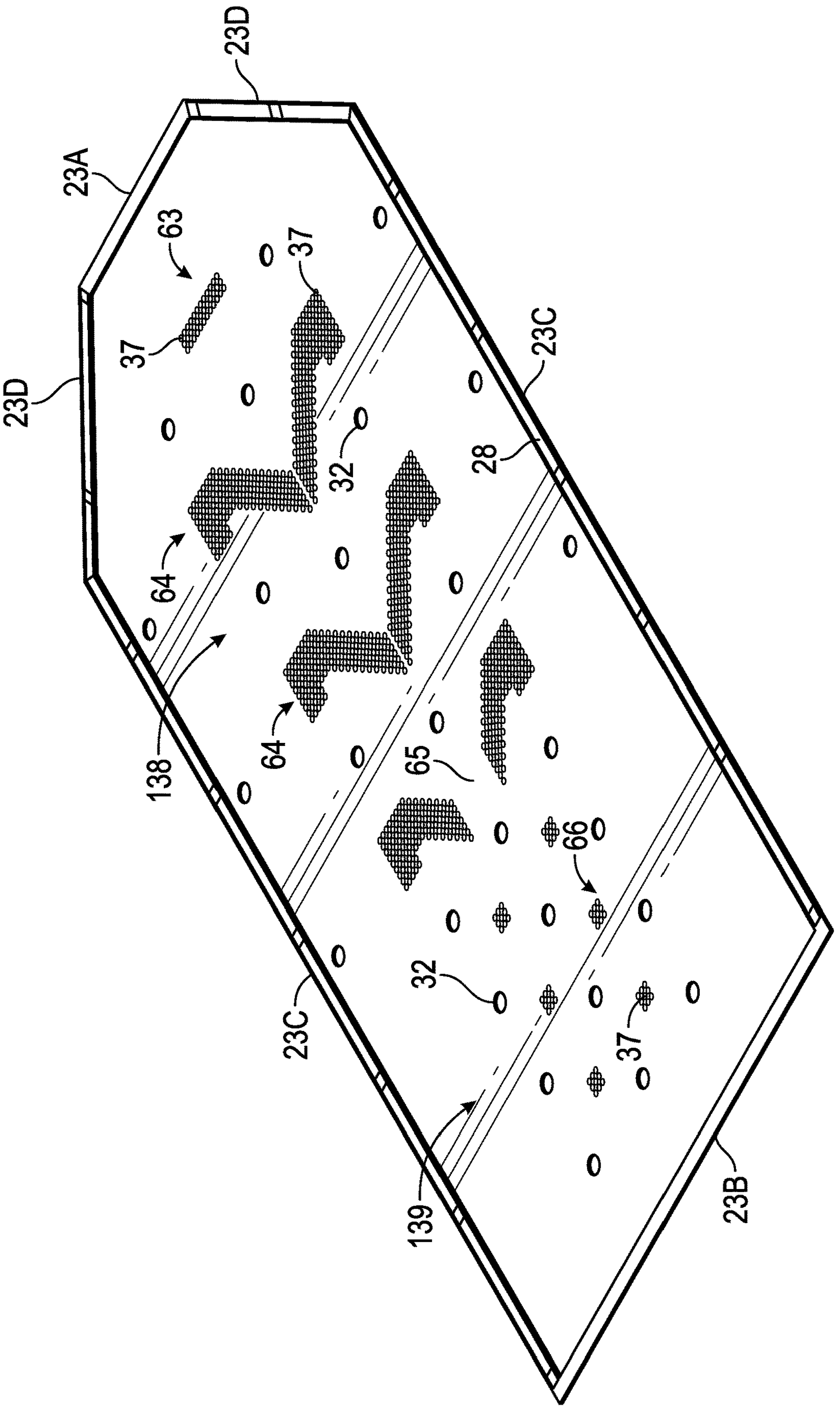
FIG. 15 is a bottom perspective view of the inflatable patient support device of FIG. 10, shown in the non-inflated state.

FIGS. 13 and 15 illustrate the passages 37 in a second embodiment. The passages in this embodiment are arranged in four configurations having in the range of 800 to 1000 total passages. In some embodiments, the total number of passages 37 is in the range of 850 to 950. In some embodiments, the total number of passages 37 is in the range of 890 to 910. Toward the head of the device 20 there is a first configuration. The first configuration of passages 37 is a rectangular group 63 of passages. In this embodiment, the group 63 has twelve parallel longitudinal columns of three passages 37. The second configuration is located near the portion of the device 20 for carrying the upper torso and hips of the patient. The second configuration of passages is made up of groups 64 of passages 37 that are positioned between the connection areas 32 of the first pattern 138. The groups 64 of passages 37 form a substantially V-shaped configuration with a base of the V pointing in the direction of the foot edge 23B. The groups 64 have in the range of 300 to 350 passages 37. The third configuration of passages 37 in this embodiment is similar to the second configuration except for a space 65 between each side of the V such that the passages do not meet in a point near the center. In the embodiment shown, the third configuration of passages is located between the first pattern 138 and the second pattern 139 of connection areas 32. In some embodiments, the third configuration is the same as the second configuration. A fourth configuration of passages 37 is made up of a plurality of groups 66 of passages 37, arranged in longitudinally extending columns between the longitudinal columns of the second pattern 139 of connection areas. Each group 66 in this embodiment includes nine passages arranged in a symmetrical square arrangement. In other embodiments, the passages 37 may be shaped, located, and/or configured differently, such as by using more or fewer passages that are smaller or larger in size and/or positioned relative to one another in a different shape or configuration.

Figure 16:
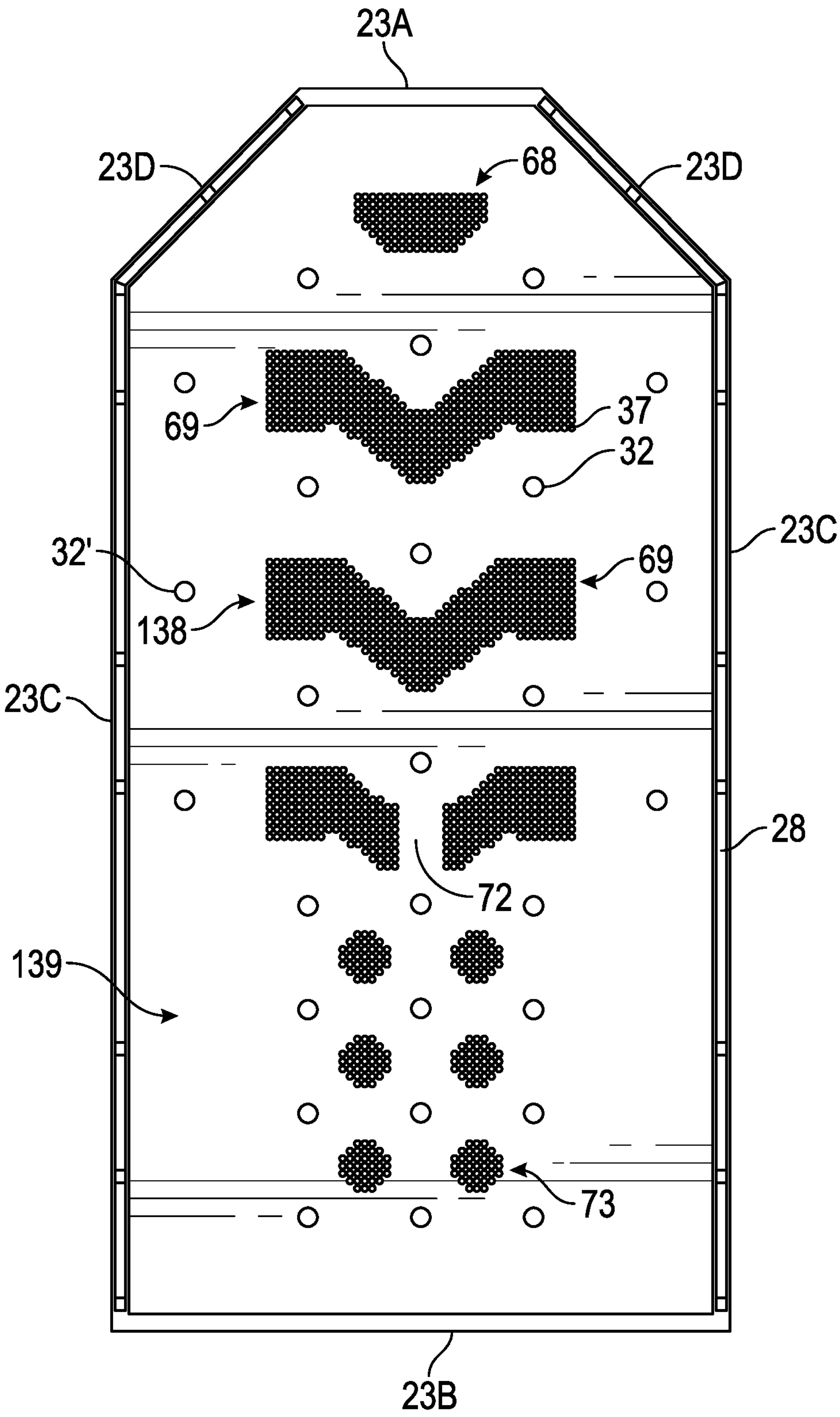
FIG. 16 is a bottom perspective view of a fourth embodiment of an inflatable patient support device.

FIG. 16 illustrate the passages 37 in a third embodiment. The embodiment shown in FIG. 16 can be incorporated in a device 20 that includes many features that are similar or identical to the features shown and described above with respect to the embodiments in FIGS. 10-15, both in structure and in function. Such similar or identical structures and functions in the embodiment of FIGS. 10-15 will not otherwise be shown or described in detail for the sake of brevity. Similar reference numbers are used with respect to the embodiment of FIG. 16 to reference features similar to those in the embodiments of FIGS. 10-15. The passages 37 in the embodiment of FIG. 16 are arranged in four configurations having in the range of 1400 to 1700 total passages. In some embodiments, the total number of passages 37 is in the range of 1500 to 1650. In some embodiments, the total number of passages 37 is in the range of 1550 to 1600. Toward the head of the device 20 there is a first configuration. The first configuration of passages 37 is a group 68 of passages. In this embodiment, the group 68 is shaped like a truncated funnel which is wider near the top and narrows. At its widest portion, the group 68 has 18 passages 37 arranged in a line. The second configuration is located near the portion of the device 20 for carrying the upper torso and hips of the patient. The second configuration of passages is made up of groups 69 of passages 37 that are positioned between the connection areas 32 of the first pattern 138. The groups 69 of passages 37 form a substantially V-shaped configuration with a base of the V pointing in the direction of the foot edge 23B. The groups 69 have in the range of 800 to 950 passages 37. The third configuration of passages 37 in this embodiment is similar to the second configuration except for a space 72 between each side of the V such that the passages do not meet in a point near the center. In the embodiment shown, the third configuration of passages is located between the first pattern 138 and the second pattern 139 of connection areas 32. In some embodiments, the third configuration is the same as the second configuration. A fourth configuration of passages 37 is made up of a plurality of groups 73 of passages 37, arranged in two longitudinally extending columns between the longitudinal columns of the second pattern 139 of connection areas. Each group 73 in this embodiment includes thirty-seven passages arranged in a circle configuration. In other embodiments, the passages 37 may be shaped, located, and/or configured differently, such as by using more or fewer passages that are smaller or larger in size and/or positioned relative to one another in a different shape or configuration.

The distribution of the passages 37 may vary depending on the desired performance of the device 20. In some embodiments, the passages 37 are more densely distributed in some portions of the device 20 relative to other portions of the device 20. The passages 37 in the embodiment illustrated in FIGS. 4,6, 13, 15, and 16 are distributed at a relatively high density in a first area 63 of the device 20 more proximate to the head edge 23A that is positioned beneath the head, upper torso and hips of the patient 70. The passages 37 in this embodiment are distributed relatively less densely in a second area 65 of the device 20 more proximate to the foot edge 23B that is positioned beneath the legs of the patient 70. In the embodiment illustrated in FIGS. 4 and 6, a gap area 67 where no passages 37 exist is defined between the first and second areas 63, 65, in the area that is positioned beneath the upper legs of the patient 70. This configuration provides greater airflow and greater friction reduction beneath the device 20 in the areas where the greatest amount of the weight of the patient 70 rests, i.e., beneath the upper torso and hips of the patient 70. In other embodiments, the device 20 may have a different arrangement of passages 37, such as a symmetrical or evenly-distributed arrangement. In an additional embodiment (not shown), some or all of the passages 37 may be covered by one or more air-permeable members on the inner and/or outer surfaces of the bottom sheet 27, such that the air passes through the air-permeable member(s) when exiting the passages 37. This configuration may be particularly useful in embodiments where the passages 37 are larger in size, to limit airflow through the passages 37 and/or improve diffusion of air flowing through the passages 37. In certain configurations, portions of an inflation-limiting member may cover one or more of the passages 37. As used herein, an "air-permeable material" is a material that permits air to pass through, without the necessity for manually forming holes, passages, perforations, slits, openings, etc., in the material, such as by mechanical and/or laser cutting methods.

The distribution of passages 37 is not limited to the specific arrangements shown in the embodiments of FIGS. 4, 6, 13, 15, and 16. The passages may vary in number and distribution in any way that provides a sufficient amount of surface area for the effective passage of airflow between the bottom surface 22 of the device 20 and the surface upon which the device 20 sits. In some embodiments, the effective surface area of the passages 37 is in the range of 0 to 3% of the total area of the bottom sheet 27. In some embodiments, the effective surface area of the passages 37 is in the range of 0.5% to 2% of the total area of the bottom sheet 27. In some embodiments, the effective surface area of the passages is approximately 1.5% of the total area of the bottom sheet 27.

In some embodiments, the top surface 21 of the device 20 has at least a portion formed of a high-friction or gripping material 24, as depicted in the non-limiting examples of FIGS. 2, 3, 5, 8, and 10 and the bottom surface 22 has at least a portion formed of a low-friction material. The high-friction material 24 may be in the form of one or more pieces of high-friction sheet material connected to the top surface 21 of the inflatable body 30 in a surface-to-surface, confronting relation to form a layered structure, in various embodiments. For example, the high friction material 24 may be a knitted material, which can enhance comfort, and may be made of polyester and/or another suitable material. The material 24 can then be treated with a high friction substance, such as a hot melt adhesive or appropriate plastic, which can be applied as a discontinuous coating to promote breathability. In another embodiment, both the top and bottom sheets 26, 27 are made from the low-friction material, such as by using a low-friction sheet material, and the high-friction material 24 may be connected to at least the top sheet 26. For example, the high-friction material 24 may be or include a coating applied to the inflatable body 30, such as a spray coating or silkscreen. This coating may be a polyurethane coating that is waterproof and/or breathable in one embodiment. In a further embodiment, the portion of the inflatable body 30 forming the top surface 21 (e.g., top sheet 26) may be formed of the high-friction material 24, while the portion of the inflatable body 30 forming the bottom surface 22 (e.g., bottom sheet 27) may be formed of the low-friction material. It is noted that the high-friction material 24 may form or cover the entire top surface 21 of the device 20 in one embodiment, or may only form or cover a portion of the top surface 21 in another embodiment, e.g., the low-friction material may form a portion of the top surface 21, with the edges of the high-friction material 24 being recessed from the edges 23 of the device 20. Similarly, the low-friction material may form at least a portion of the bottom surface 22 of the device 20.

In some embodiments, the bottom surface 22 may also have at least a portion formed of a high-friction or gripping material. In this embodiment, the high-friction material is preferably positioned in the non-contact areas (e.g., the areas of the bottom sheet 27 that are not in contact with the support surface when the device 20 is inflated). In this way, the bottom sheet 27 has a desirable low friction quality when the device 20 is inflated and is being used to lift or otherwise maneuver the patient. However, when the device 20 is not inflated (i.e. is not being used to maneuver the patient) and the patient is laying on top of the device 20 on a support surface, the high friction material comes into contact with the surface and minimizes slipping and moving of the device 20 relative to the surface. Any of the high friction materials or additives described above with respect to use on the top surface 21 may also be used on the bottom surface 22. The device 20 may have a high friction material on the bottom surface 22 that is the same as that which is used on the top surface 21, or the high friction material on the bottom surface 22 may be different than that which is used on the top surface 21. In some embodiments, the high friction material may be a directional glide material, which allows relative movement between the material and an external element (i.e., the support surface, a sheet, a positioning wedge, etc.) in one or more certain directions and prevents relative movement in other directions.

As described in greater detail below, the low-friction material permits sliding of the device 20 in contact with the supporting surface 12. The high-friction material 24 provides increased resistance to slipping or sliding of the patient 70 and/or the body pad 40 on which the patient 70 may be lying, in contact with the device 20, and increased resistance to slipping of the device 20 on the support surface when it is not inflated (i.e., not being used for maneuvering of the patient), or a controlled relative movement between elements of the system by way of a directional glide material. The low-friction material may also have rip-stop properties and/or may have suitable structural strength and stability and other performance properties to form the primary structural component of the device 20. The high-friction 24 and/or low-friction materials can also be treated with a water repellant, such as polytetrafluoroethylene (PTFE). In other embodiments, the high-friction 24 and/or low-friction materials may include any combination of these components, and may contain other components in addition to or instead of these components.

Generally, the high friction material 24 has a coefficient of friction that is higher than the coefficient of friction of the low friction material. In one embodiment, the coefficient of friction for the high friction material 24 is about 8-10 times higher than the coefficient of friction of the low friction material. In another embodiment, the coefficient of friction for the high friction material 24 is between 5 and 10 times higher, or at least 5 times higher, than the coefficient of friction of the low friction material. The coefficient of friction, as defined herein, can be measured as a direct proportion to the pull force necessary to move either of the materials in surface-to-surface contact with the same third material, with the same normal force loading. Thus, in the embodiments above, if the pull force for the high friction material 24 is about 8-10 times greater than the pull force for the low friction material, with the same contact material and normal loading, the coefficients of friction will also be 8-10 times different. It is understood that the coefficient of friction may vary by the direction of the pull force, and that the coefficient of friction measured may be measured in a single direction. For example, in one embodiment, the above differentials in the coefficients of friction of the high friction material 24 and the low friction material may be measured as the coefficient of friction of the low friction material based on a pull force normal to the side edges 23C (i.e. proximate the handles 28) and the coefficient of friction of the high friction material 24 based on a pull force normal to the top and bottom edges 23A-B (i.e. parallel to the side edges 23C).

Additionally, the coefficient of friction of the interface between the high-friction material 24 and the body pad 40 is greater than the coefficient of friction of the interface between the low friction material and the supporting surface 12 (which may include a bed sheet). It is understood that the coefficients of friction for the interfaces may also be measured in a directional orientation, as described above. In one embodiment, the coefficient of friction for the interface of the high friction material 24 is about 8-10 times higher than the coefficient of friction of the interface of the low friction material. In another embodiment, the coefficient of friction for the interface of the high friction material 24 is between 5 and 10 times higher, or at least 5 times higher, than the coefficient of friction of the interface of the low friction material. It is understood that the coefficient of friction for the interface could be modified to at least some degree by modifying factors other than the device 20. For example, a high-friction material (e.g., substance or surface treatment) may be applied to the bottom surface of the pad 40, to increase the coefficient of friction of the interface, which may be done in addition to, or in place of, using the high-friction material 24 on the device 20. An example of a calculation of the coefficients of friction for these interfaces is described in greater detail in U.S. Patent Application Publication No. 2012/0186012, published Jul. 26, 2012, which is incorporated by reference herein in its entirety and made part hereof, which calculation is made using a rip-stop nylon material as the low friction material and a knitted material treated with a hot melt adhesive as the high friction material 24. The relative coefficients of friction of the high friction material 24 and the low friction material used in the example calculation are also described in the aforementioned publication.

In an alternate embodiment, the device 20 may not utilize a high friction surface, and instead may utilize a releasable connection to secure the pad 40 in place with respect to the device 20. For example, the device 20 and pad 40 may include complementary connections, such as hook-and-loop connectors, buttons, snaps, or other connectors. In a further embodiment, the device 20 may be used without a pad 40, with the patient 70 directly in contact with the top surface 21 of the sheet, and the high-friction material 24 can still resist sliding of the patient on the device 20.

In some embodiments, such as the embodiments illustrated in FIGS. 1-6 and 10-16, the device 20 may also include one or more handles 28 to facilitate pulling and other movement of the device 20. Such handles 28 may be configured for multiple different types of movement, including "boosting" the patient 70 on the supporting surface 12 (i.e., moving the patient 70 toward the head 13), positioning the patient 70 on the supporting surface 12, turning the patient 70, moving the patient 70 from one support structure 14 to another, etc. As shown in FIGS. 4, 6, 11, 13, 15, and 16 the device 20 has handles 28 formed by strips 29 of a strong material that are connected (e.g., stitched) in periodic fashion to the bottom surface 22 at or around both side edges 23C of the device 20, the chamfered edges 23D (in the embodiments of FIGS. 10-16), and/or the top edge 23A of the device. The non-connected portions can be separated slightly from the device 20 to allow a user's hands to slip underneath, and thereby form the handles 28. In an embodiment having chamfered edges 23D, the handles 28 along the chamfered edge 23D may be connected with a greater distance between the connection locations (e.g., stitched locations), such that the handles 28 may be separated from the device 20 to hook, stretch, or otherwise pass over a corner of the supporting surface 12, such as bed, on which the device 20 is positioned. This provides a more secure relationship between the device 20 and the support surface 12, when needed. In some such embodiments, the handles 28 may be connected to the bottom surface 22 only at the transition, or corner, between the chamfered edge 23D and the side edge 23C, and between the chamfered edge 23D and the head edge 23A. In other embodiments, the device 20 may include a different number or configuration of the handles 28 as described above, including handles that may extend outward from the sides of the device 20 for greater leverage. Further, the handles 28 may be connected to the device 20 in a different way, such as by heat welding, sonic welding, adhesive, etc. Other types of handles may be utilized in further embodiments.

Figure 7:
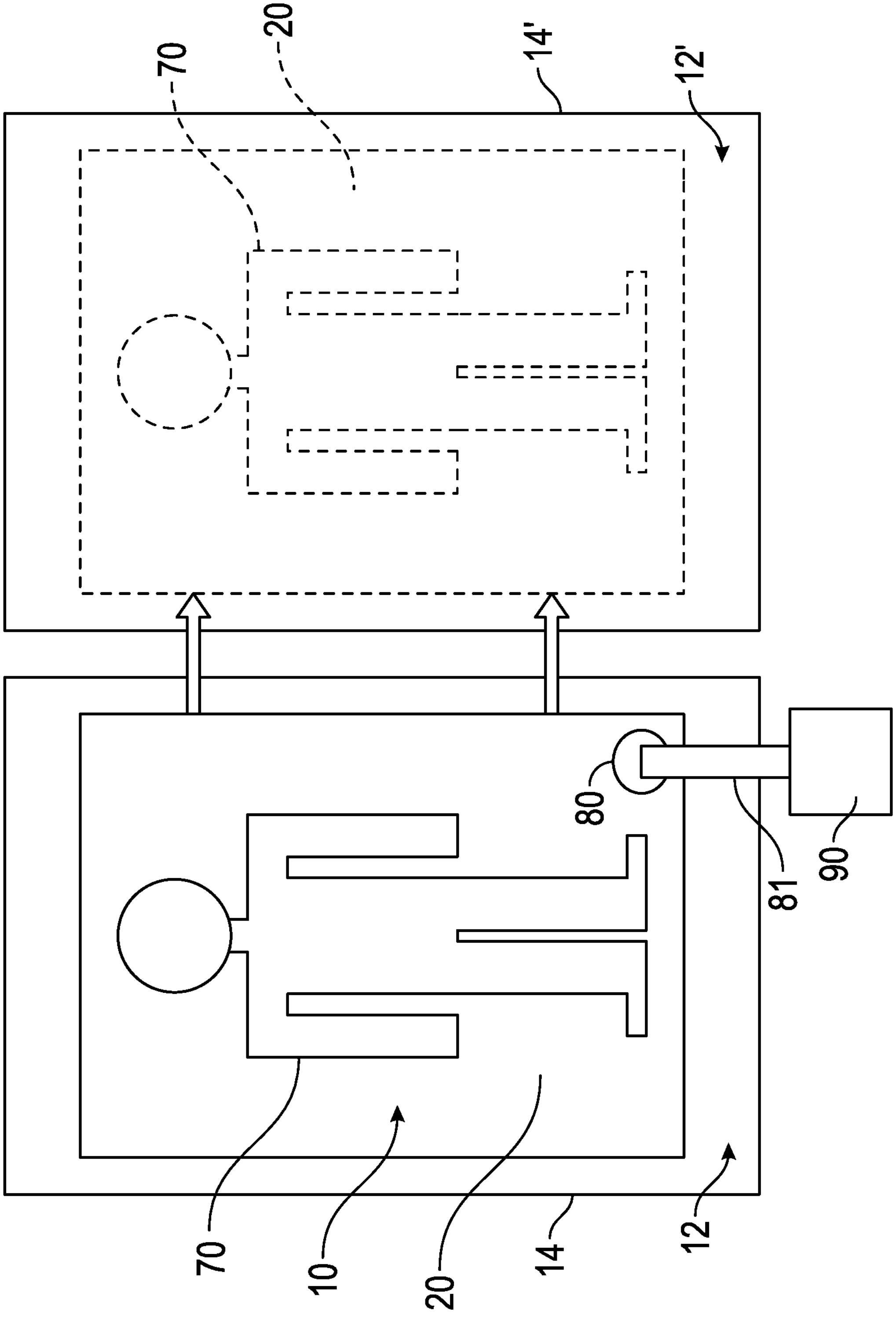
FIG. 7 is a top schematic view illustrating use of the system of FIG. 1 to transfer a patient from one support structure to another support structure.
Figure 9:
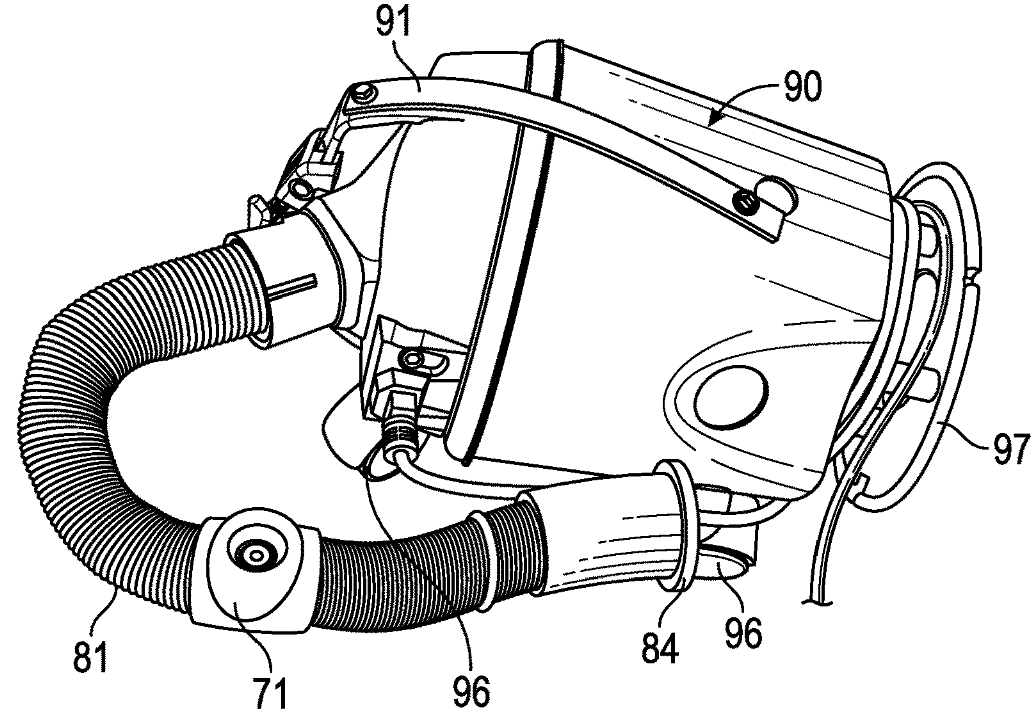
FIG. 9 is a perspective view of one embodiment of a pump that is usable as an air output in connection with an inflatable patient support device according to aspects of the disclosure.
Figure 10:
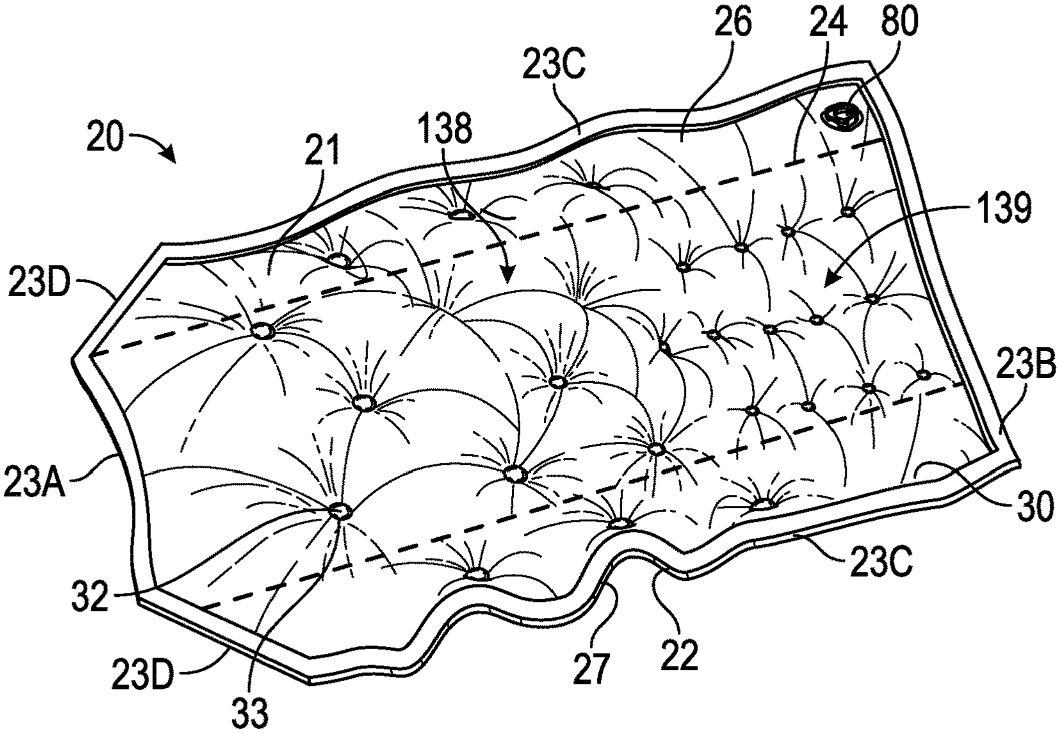
FIG. 10 is a top perspective view of a third embodiment of an inflatable patient support device usable in connection with the system of FIG. 1, shown in an inflated state.
Figure 11:
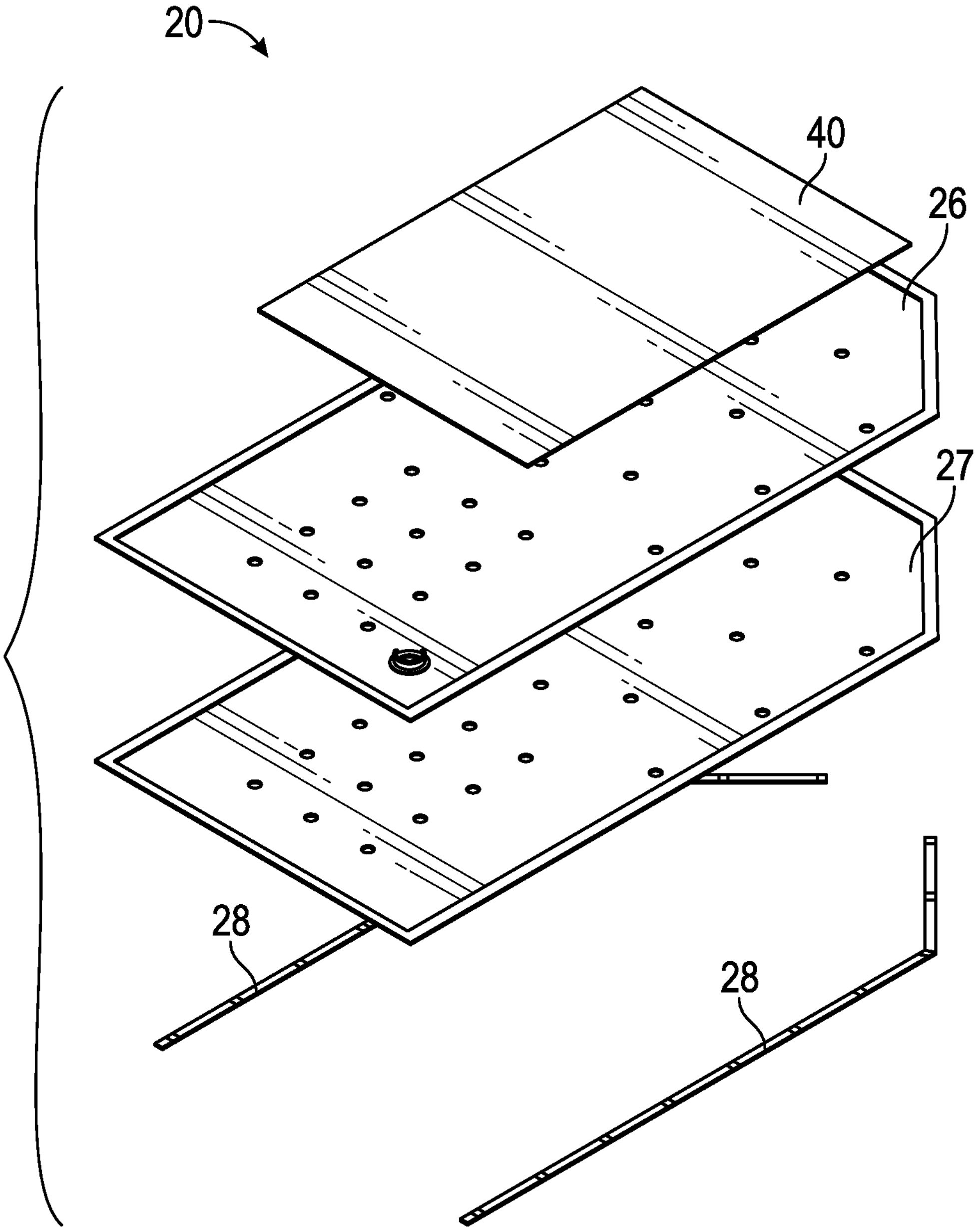
FIG. 11 is an exploded view of the inflatable patient support device of FIG. 10.
Figure 12:
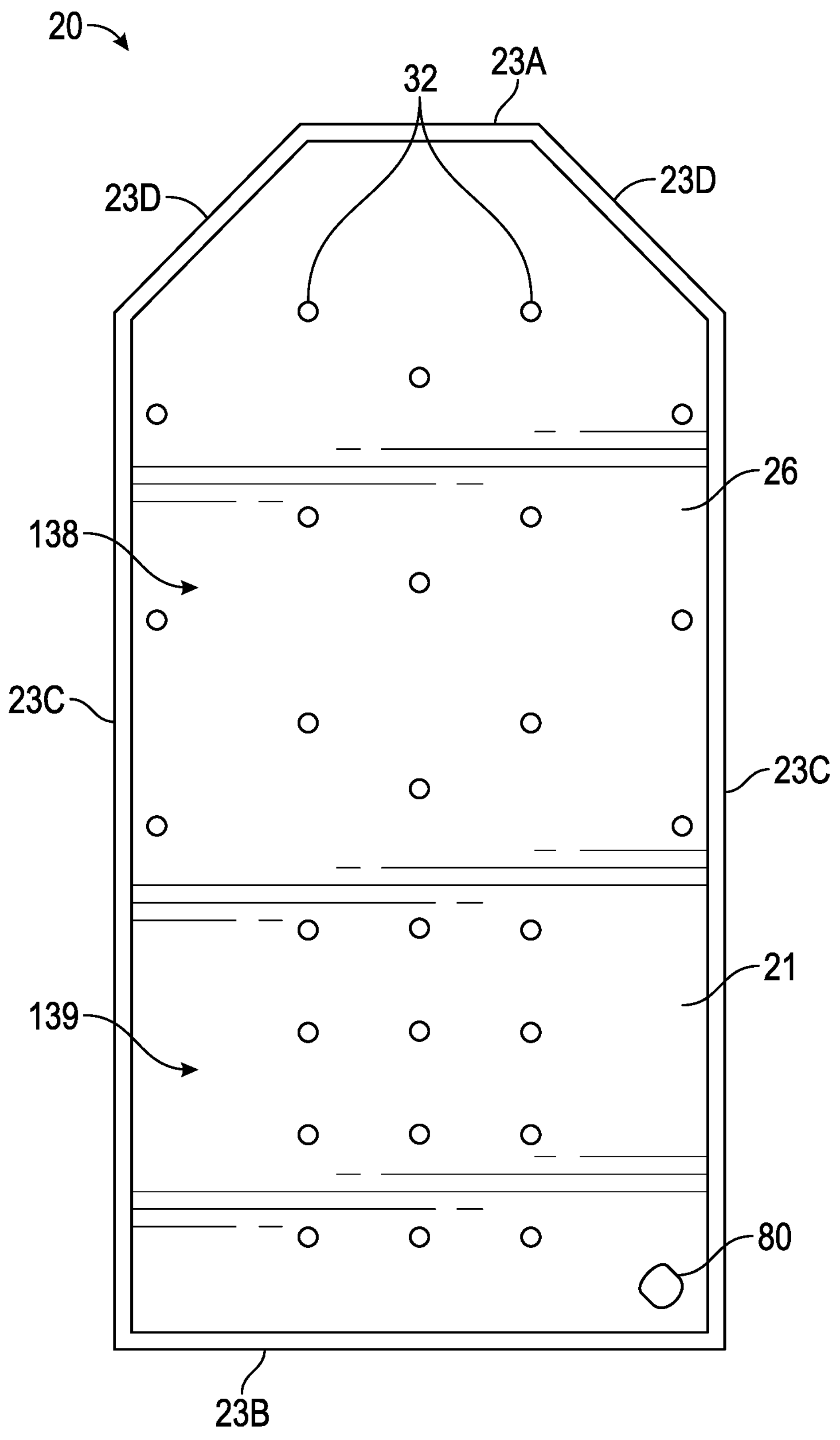
FIG. 12 is a top plan view of the inflatable patient support device of FIG. 10, shown in a non-inflated state.
Figure 17:
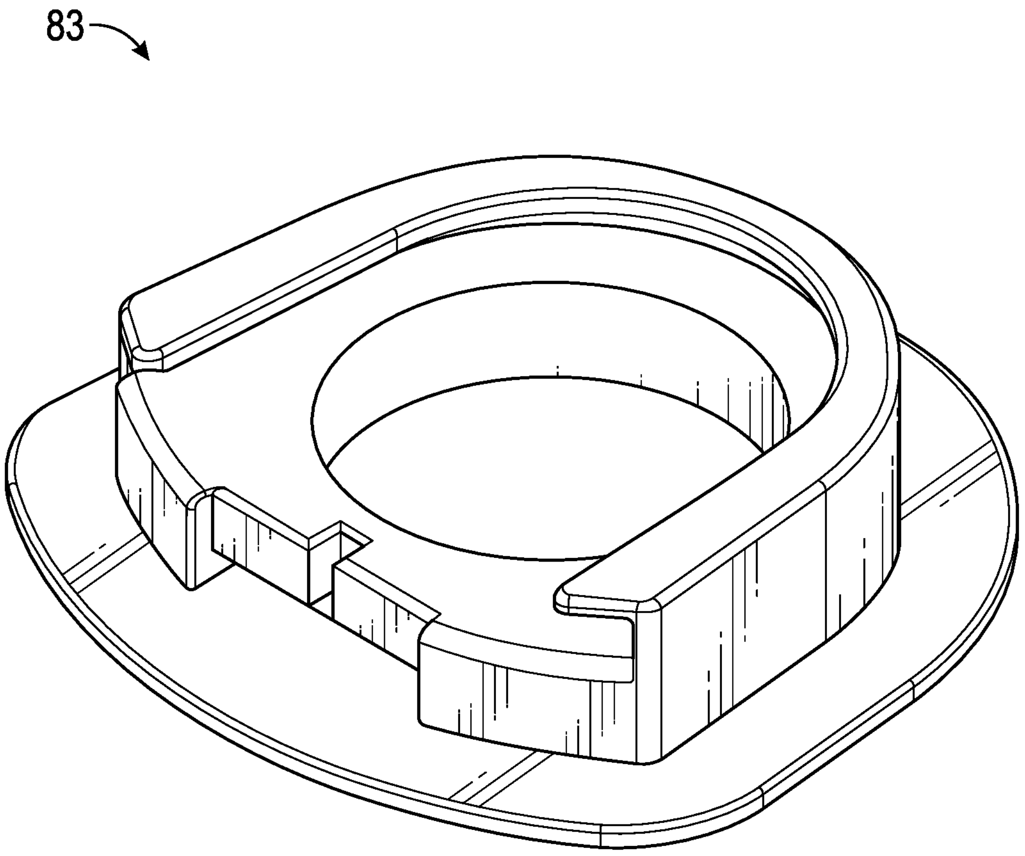
FIG. 17 is a perspective view of an inflation port usable in connection with an inflatable patient support device.

The device 20 may be inflated by connection to an air output 81 as illustrated in FIGS. 1 and 7. The device 20 may include one or more inflation ports 80 for connection to the air output 81. It is understood that a device 20 with multiple ports 80 may include ports 80 on one or more different edges 23A-C of the device 20, and that the port(s) 80 may be along any edge 23A-C of the device 20. In the embodiments of FIGS. 1-6, 8, and 10-16, the device 20 includes a single inflation port 80 located adjacent one of the side edges 23C of the device 20, proximate the foot edge 23B. If a second inflation port 80 is included, then the device 20 may be configured such that only one of the inflation ports 80 is generally used at a time. In one embodiment, each of the ports 80 includes an opening 82 configured to be in communication with a portion of the air output 81 and a retaining mechanism 83 configured to retain the portion of the air output 81 in communication with the opening 82. The retaining mechanism 83 in the embodiment of FIGS. 1-6 is a slot around at least a portion of the opening 82 that receives a flange 84 of the air output 81 to retain the air output 81 to the opening 82. FIG. 17 depicts another embodiment of a retaining mechanism 83 that retains a portion of the air output 81 (see FIGS. 1, 7, and 9) in communication with the port 80 (see FIGS. 1, 3, 5, 7, 8, 12, and 14). Retaining mechanism 83 has a base portion 84 to be coupled to the device 20. Extending above the base portion 84 is an engagement portion 85 which is configured to cooperate with a distal end of the air output 81. In the embodiment shown in FIG. 17, the engagement portion 85 includes a flange 86 partially surrounding a top portion of the engagement portion 85, such that a portion of the air output 81 can slidably engage under the flange until the air output 81 is aligned with opening 82 of the port 80. The flange 86 is configured to cooperate with a groove or slot in the air output 81, and maintains the connection between the air output 81 and the port 80. Other configurations of the retaining mechanism 83 could be used. Furthermore, other fasteners could be used, such as snaps, buttons, ties, etc. The air output 81 illustrated in FIGS. 1, 7, and 9 is a hose that may be connected to a pump 90 (see FIG. 9) that pumps air through the air output 81. As shown in FIGS. 1, 7, and 9, the air output 81 (hose) is connected in communication with the opening 82, and the retaining mechanism 83 engages the air output 81 to secure the air output 81 in place. The device 20 may also have a valve (not shown) in communication with the port 80, to allow airflow into the cavity 31 and resist airflow out of the cavity 31 through the opening 82. It is understood that the inflation components of the system 10 are described for use with air, but may be used with any suitable gas. Accordingly, terms such as "air" and "airflow" as used herein may refer to any suitable gas.

One embodiment of the pump 90 is shown in FIG. 9. The pump 90 in this embodiment has a hose 81 that functions as the air output 81, as described above. Additionally, the pump 90 may have an attachment mechanism 91 that is configured to releasably attach the pump 90 to a structure such as a railing of the support structure 14. In the embodiment of FIG. 9, the attachment mechanism 91 is a strap, but a different structure may be used, such as a hook, carabiner clip, etc. The pump 90 in FIG. 9 includes wheels 96 for mobility, and the wheels 96 are placed along the longest dimension of the pump 90, such that the pump 90 is configured to sit in a low-profile configuration when sitting on the wheels 96. One or more of the wheels 96 may be in the form of casters in one embodiment. This low-profile configuration may permit the pump 90 to sit under the support structure 14 and out of the way when not in use. The pump 90 also includes a standing base 97 configured to support the pump 90 in a standing configuration so that the wheels 96 do not contact the ground and the pump 90 does not move freely. As another example, the pump 90 may include one or more switches 71 for powering the pump 90 on/off and potentially other controls as well. The switch 71 in the embodiment of FIG. 9 is positioned near the outlet end of the hose 81 for enhanced accessibility to caregivers during use. Such a switch 71 or switches may include one or more hard-wired switches and/or remote switches (e.g., an RF switch). The pump 90 may include additional features as desired.

The body pad 40 is typically made from a different material than the device 20 and contains an absorbent material, along with possibly other materials as well. The pad 40 provides a resting surface for the patient, and can absorb fluids that may be generated by the patient. The pad 40 may also be a low-lint pad, for less risk of wound contamination, and is typically disposable and replaceable, such as when soiled. The top and bottom surfaces of the pad 40 may have the same or different coefficients of friction. Additionally, the pad 40 illustrated in the embodiment of FIG. 1 is close to the same width and shorter in length than the device 20, but may be a different size in other embodiments. In one embodiment, the pad 40 may form an effective barrier to fluid passage on one side (e.g., the underside), in order to prevent the device 20 from being soiled, and may also be breathable, in order to permit flow of air, heat, and moisture vapor away from the patient and lessen the risk of pressure ulcers (bed sores). The pad 40 may be configured differently in other embodiments, and the system 10 may not include a pad 40 in certain embodiments.

The device 20 may further include one or more selective gliding assemblies (not shown) in another embodiment, which can resist movement in one or more directions and allow free movement in one or more different directions, which may be transverse or opposed to each other. Such selective gliding assemblies may be associated with the bottom surface 22 to influence movement of the device 20 and/or associated with the top surface 21 to influence movement of the patient 70 with respect to the device 20. It is understood that the "resistance" to sliding may be expressed using a difference in pull force necessary to create sliding movement between the same pieces of material in different directions. For example, if a selective gliding assembly is considered to "resist" sliding in one direction and "allow" sliding in another direction, this may be determined by having a relatively greater pull force necessary to create sliding movement between two engaging materials in the former direction and a relatively smaller pull force necessary to create sliding movement between the same two materials in the latter direction.

All or some of the components of the system 10 can be provided in a kit, which may be in a pre-packaged arrangement, as described in U.S. Patent Application Publication No. 2012/0186012, published Jul. 26, 2012, which is incorporated by reference herein in its entirety and made part hereof. For example, the device 20 (deflated) and the pad 40 may be provided in a pre-folded arrangement or assembly, with the pad 40 positioned in confronting relation with the top surface 21 of the device 20, in approximately the same position that they would be positioned in use, and the device 20 and pad 40 can be pre-folded to form a pre-folded assembly. This pre-folded assembly can be unfolded when placed beneath a patient. It is understood that different folding patterns can be used. The pre-folded device 20 and pad 40 can then be unfolded together on the bed 12 to facilitate use of the system 10. Additionally, the device 20 and the pad 40 can be packaged together, by wrapping with a packaging material to form a package, and may be placed in the pre-folded assembly before packaging. Other packaging arrangements may be used in other embodiments.

An example embodiment of a method for using the system 10 to transfer a patient 70 from one support structure 14 to another support structure 14' is illustrated in part in FIG. 7. It is understood that all embodiments of the device 20 shown and described herein may be utilized in the same or a similar method, with the same or similar functionality. As described above, the device 20 and the pad 40 may be provided as a pre-folded assembly, and the device 20 and pad 40 together may be placed beneath the patient in a pre-folded state and unfolded beneath the patient 70. Examples of methods for placing the device 20 and the pad 40 beneath the patient and for removing and replacing the pad 40 are shown and described in U.S. Pat. No. 8,789,533, which is incorporated by reference herein. Once the device 20 and the pad 40 are placed beneath the patient 70, the device 20 can be inflated by connecting the air output 81 to the inflation port 80 so that the retaining mechanism 83 secures the connection. Air can then be pumped into the device 20 through the air output 81 to inflate the device 20. While the device 20 is inflated beneath the patient 70, the device 20 and the patient 70 can be moved together by sliding from the supporting surface 12 of the original support structure 14 to the supporting surface 12' of the second support structure 14'. Deflation can be accomplished by simply shutting off and/or removing the air output 81. The device 20 and the patient 70 can be moved from the second support structure 14' back to the original support structure 14 or another support structure (not shown) in this same manner, and it is understood that re-inflation may be necessary if the device 20 is deflated after the first movement. The handles 28 provide locations for caregivers to securely grasp the device 20 to effect this movement and other movement of the device 20.

The use of the system 10 and methods described above can have beneficial effects for nurses or other caregivers who move, turn, transfer, and position patients. Such caregivers frequently report injuries to the hands, wrists, shoulders, back, and other areas, which injuries are incurred due to the weight of patients being moved. Use of the system 10, including the device 20 and the air output 81, can reduce the strain on caregivers when turning, positioning, boosting, and/or transferring patients. For example, existing methods for transferring a patient 70 may utilize lifting and rolling to move the patient 70, rather than sliding, or may require lifting mechanisms to lift the patient. Sliding the patient using existing systems and apparatuses can cause friction and shearing on the patient's skin, which can damage the patient's skin and/or potentially risk the integrity of sutures or other closures on incisions or wounds, such as during or after surgery. Lifting may also not be a practical option for some patients, such as patients 70 whose bodies cannot withstand the stress of lifting (e.g., post-surgery patients) or patients 70 who are extremely large in size. The ease of motion and reduction in friction forces provided by the system 10 allows sliding of the patient 70, which greatly reduces stress and fatigue on caregivers while moving and/or turning the patient 70. Sliding the patient smoothly on an inflated device 20 as provided by the system 10 greatly reduces shearing forces and stress on the patient 70. The combination of the low friction material and the airflow through the passages 37 contributes significantly to these benefits. Furthermore, use of inflated device 20 improves weight distribution, thereby making patient transfer easier, by increasing the surface area in contact with the support surface; the surface area of a patient directly on the support surface is much less than the surface area of the inflated device 20 on the support surface. In particular, these features provide decreased force necessary for transferring a patient 70 from one support structure 14 to another support structure 14'. Additionally, the distribution of the passages 37 on the device 20 provides the greatest amount of friction reduction in the areas where friction is the highest, i.e., the areas that bear the most weight of the patient 70. Further, the configuration and arrangement of the inflation-limiting members (connection areas 32 and connection lines 60) create an advantageous inflated shape for the device 20, to provide support for the patient 70 in the areas of greatest need and to resist sliding or rolling of the patient 70 off of the device 20 during movement. The high friction material 24 also assists in resisting sliding or rolling of the patient 70 off of the device 20. Still other benefits and advantages over existing technology are provided by the system 10 and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A method of manufacturing a patient transfer system, comprising:

obtaining an inflatable device comprising:

a top sheet of material and a bottom sheet of material connected to the top sheet of material defining a cavity therebetween to be inflated;

a plurality of passages in the bottom sheet extending from the cavity to an exterior of the device, wherein the passages are configured to permit air to pass from the cavity to the exterior of the device and to flow between a bottom surface of the device and a supporting surface upon which the device is configured to rest;

a first plurality and a second plurality of inflation-limiting members formed by connections between the top sheet and bottom sheet, wherein each inflation-limiting member comprises connections arranged in a plurality of concentric shapes;

wherein a first distance between a first inflation-limiting member and a second inflation-limiting member of the first plurality of inflation-limiting members is greater than a second distance between a third inflation-limiting member and a fourth inflation-limiting member within the second plurality of inflation-limiting members;

wherein the first plurality of inflation-limiting members is disposed within a head support portion, such that the head support portion has a top surface that is raised higher than a second area of the device containing the second plurality of inflation-limiting members; and an input configured for receiving air to inflate the device; and providing an absorbent body pad with the inflatable device, the absorbent body pad configured to be positioned between the top sheet of material and a patient positioned on the inflatable device.

2. The method of claim 1, further comprising arranging the inflatable device and the absorbent pad in a pre-folded arrangement.

3. The method of claim 2, wherein in the pre-folded arrangement, the pad is positioned in confronting relationship with a top surface of the inflatable device in approximately the same position that the inflatable device and the absorbent pad would be positioned relative to one another in use.

4. The method of claim 1, further comprising packaging the inflatable device and the absorbent pad together by wrapping with a packaging material.

5. The method of claim 1, further comprising replacing the absorbent body pad.

6. The method of claim 1, wherein providing an absorbent body pad comprises providing a new absorbent body pad to replace a used absorbent body pad.

7. A method comprising:

packaging an assembly comprising an inflatable device and an absorbent body pad by wrapping the inflatable device and the absorbent body pad together in a packaging material, wherein the inflatable device comprises:

a top sheet of material and a bottom sheet of material connected to the top sheet of material defining a cavity therebetween to be inflated;

a plurality of passages in the bottom sheet extending from the cavity to an exterior of the device, wherein the passages are configured to permit air to pass from the cavity to the exterior of the device and to flow between a bottom surface of the device and a supporting surface upon which the device is configured to rest;

a first plurality and a second plurality of inflation-limiting members formed by connections between the top sheet and bottom sheet, wherein each inflation-limiting member comprises connections arranged in a plurality of concentric shapes;

wherein a first distance between a first inflation-limiting member and a second inflation-limiting member of the first plurality of inflation-limiting members is greater than a second distance between a third inflation-limiting member and a fourth inflation-limiting member within the second plurality of inflation-limiting members;

wherein the first plurality of inflation-limiting members is disposed within a head support portion, such that the head support portion has a top surface that is raised higher than a second area of the device containing the second plurality of inflation-limiting members; and an input configured for receiving air to inflate the device.

8. The method of claim 7, further comprising arranging the inflatable device and the absorbent pad in a pre-folded arrangement.

9. The method of claim 8, wherein in the pre-folded arrangement, the pad is positioned in confronting relationship with a top surface of the inflatable device in approximately the same position that the inflatable device and the absorbent pad would be positioned relative to one another in use.

* * * * *